United States Patent [19]

Davis et al.

[11] 4,354,229

[45] Oct. 12, 1982

[54] LOOP INITIALIZATION MECHANISM FOR A PEER-TO-PEER COMMUNICATION SYSTEM

[75] Inventors: Jonathan B. Davis, Boca Raton; Charles S. Lanier, Delray Beach; Daniel T. W. Sze, Boca Raton; Leonard Weiss, Hollywood, all of Fla.

[73] Assignee: International Business Machines Corporation, Armonk, N.Y.

[21] Appl. No.: 129,052

[22] Filed: Mar. 10, 1980

[51] Int. Cl.³ ............................................. G06F 15/16
[52] U.S. Cl. .................................................... 364/200
[58] Field of Search ... 364/200 MS File, 900 MS File; 370/86

[56] References Cited

U.S. PATENT DOCUMENTS

| | | | |
|---|---|---|---|
| 3,564,145 | 2/1971 | Deutsch et al. | 179/15 |
| 3,680,053 | 7/1972 | Cotton et al. | 364/200 |
| 3,755,789 | 8/1973 | Collins | 364/900 |
| 3,919,484 | 11/1975 | Maxemchuk | 370/86 |
| 4,002,842 | 1/1977 | Meyr et al. | 370/86 |
| 4,007,450 | 2/1977 | Haibt et al. | 364/200 |
| 4,076,964 | 2/1978 | Henrion et al. | 179/15 BS |
| 4,103,336 | 7/1978 | Gindi et al. | 364/900 |

Primary Examiner—Raulfe B. Zache
Assistant Examiner—David Y. Eng
Attorney, Agent, or Firm—D. Kendall Cooper; John C. Black; J. Jancin, Jr.

[57] ABSTRACT

In a loop-structured communication system interconnecting a plurality of data processors without central controller, stations comprise modems which can start loop operation and achieve synchronous frame transmission around the loop through all participating stations.

In an initialization procedure after system start or after loss of frame synchronization on the loop, modems select a temporary master station.

The temporary master will adapt total loop delay to be an integer multiple of the basic frame period, and will transmit available frames. All active modems adapt their timing to the circulating stream of frames until the whole loop and all participating stations are synchronized.

Synchronization conditions are continuously monitored in all stations to start resynchronization or initialization procedures if necessary. In a specific arrangement, the location of a loop failure which prevents establishment of synchronization can be determined.

All initialization and synchronization operations are handled by the modems without participation by other functional units or by the host processing system of any station.

15 Claims, 22 Drawing Figures

FRAME FORMAT

HEAD                         TAIL

DATA ENCODING

ARBITRARY BYTE

SYNC CHARACTER

WITH AVAILABLE INDICATION:

WITH UNAVAILABLE INDICATION:

FIG. 6A
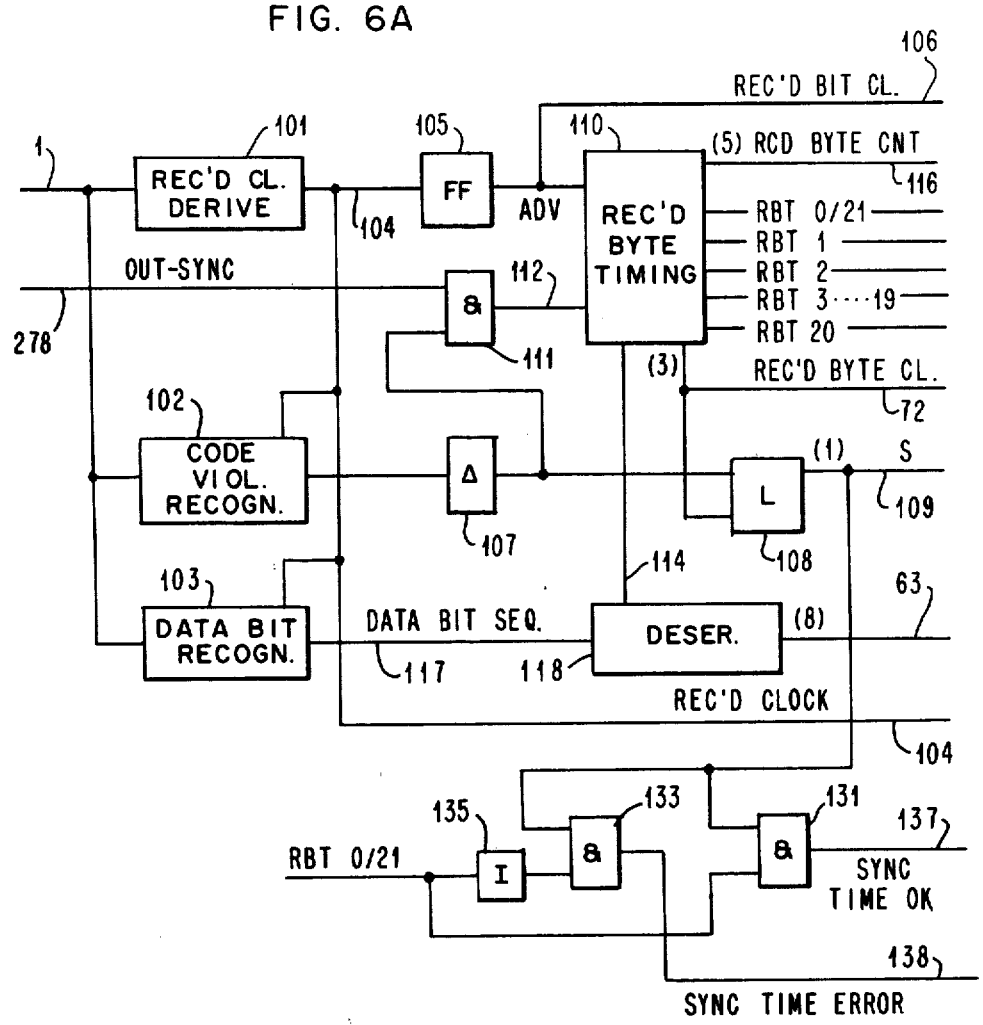
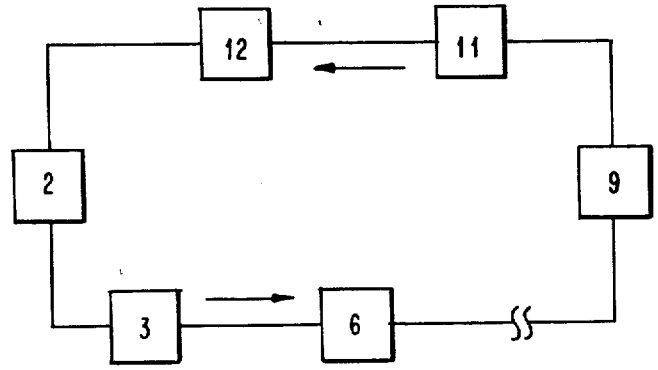
FIG. 13

TEMPORARY MASTER SELECTION

LOOP DELAY ADJUST

SYNC/RESYNC &
FLYWHEEL PROCEDURE (JUMP OUT OF SYNC PROCEDURE ONLY WHEN TIME-OUT OCCURS)

LOOP INITIALIZATION MECHANISM FOR A PEER-TO-PEER COMMUNICATION SYSTEM

TECHNICAL FIELD

The present invention relates to serial loop data communication systems including a plurality of serially interconnected stations to which data processors are attached, and more particularly to methods and apparatus for initializing operation of such loop communication systems, and for fault locating in situations where no initialization or reinitialization is possible due to a loop rupture or other loop failure.

CROSS-REFERENCE TO RELATED PATENT APPLICATIONS

The following patent applications are herewith specifically incorporated by reference:

(1) Application Ser. No. 129,053 entitled "Processor Intercommunication System", the inventors being Messrs. M. I. Davis et al and (2) Application Ser. No. 129,004 entitled "Remote Processor Initialization in a Multi-Station Peer-to-Peer Intercommunication System", the inventors being Messrs. H. M. Maxwell et al.

BACKGROUND ART

In ring-structured systems interconnecting a plurality of stations, especially in serial loop communication systems, it is important that each station is synchronized to the stream of data travelling around the loop. This adaptation of station timing to the data stream is necessary to enable correct recognition of data bytes and words by each station. In view of different propagation delays on the various sections of the loop, and varying delays in the station due to processing and/or buffering, and because of insertion or removal of stations into or from the loop, timing relations cannot be predetermined. Thus, it is necessary to initialize a loop system until each station operates in proper timing, or to reinitialize it after a malfunctioning that caused loss of synchronization in several or all stations.

In loop communication systems which include a central station or controller, this station can control initialization by sending commands to the other stations and monitoring resulting answers or conditions on the loop.

In peer-to-peer systems, however, i.e. in systems in which all stations basically have the same functions and no supervisor or control station is provided, specific methods are necessary for achieving proper loop initialization. This involves, according to the present invention, selection of a temporary master station, adapting timing relations in this and all other stations, and initiative by each active station to start an initialization procedure under certain conditions.

In prior art, several loop-type communication systems are known including various methods and means for station selection, timing signals adaptation and station synchronization.

U.S. Pat. No. 3,680,053 to Cotton et al. discloses a ring-structured transmission link which has a plurality of data handling devices connected thereto. A different priority number is allocated to each device. When a device wishes to transmit data it first transmits its own priority number on the ring and the device having the highest priority number of the devices which wish to transmit is allowed to seize the transmission link.

The disclosed method only selects a single station for transmission in an operating loop, while all other stations having a service demand must repeat their requests independently. It is desirable to have a system in which, in a non-synchronized loop, stations cooperate to select a temporary master and to get the whole loop with all active stations into synchronous operation.

U.S. Pat. Nos. 3,919,484 to Maxemchuk and 4,071,706 to Warren both describe loop communication systems in which an adaptive delay function is provided for achieving a total delay around the loop which is an integer multiple of the frame length or packet length used on the loop. In both systems this delay function is provided once only in a loop controller or a single separate synchronizing buffer, respectively. Thus, the used method would not be suitable for a peer-to-peer system in which no single common control element is provided.

In U.S. Pat. Nos. 4,076,964 and 4,086,437, both to Henrion et al., time division multiplex data transmission systems are disclosed in which an adaptation is effected between a received clock rate used for storing into a memory, and a station internal clock rate used for reading from the memory. Adaptation of incoming and outgoing data rates for automatic starting of a communications loop without central control is, however, not taught by these disclosures.

U.S. Pat. No. 4,002,842 to Meyr et al. describes a loop communication system comprising a plurality of subscriber stations and one monitoring station. This monitoring station issues synchronizing bytes to enable synchronizing of bit and byte counters in the subscriber stations, and it supervises the incoming data stream to ensure that sync bytes are generated at appropriate intervals. This system would not be operable if the monitoring station fails. It is desirable to have a mechanism in which any station can be selected as temporary master for starting the loop operation, so that stations may be connected or disconnected as desired.

In U.S. Pat. No. 3,564,145 to Deutsch et al. a loop communication system is disclosed in which a terminal detecting a fault condition because of receiving no data or mutilated data automatically generates a unique terminal address and transmits it over the loop. While downstream terminals are satisfied by these address data, the central controller receiving it can determine the fault location from the received terminal address which is accompanied by an error indication. This fault location detection method requires, however, that a predetermined central controller evaluates the incoming address, and requires that terminals between loop failure and controller still operate in synchronism.

While these prior art patents teach several aspects of selecting, timing and synchronizing in loop or Time Division Multiplexor TDM data communication systems, they do not disclose a complete mechanism for automatic loop initialization and synchronization in a peer-to-peer ring-structured arrangement of stations.

One object of the present invention is therefore a serial loop communication system in which peer-type stations cooperate to initialize operation of the loop and modems so that data transmission between stations is enabled.

Another object of the invention is a serial loop communication system in which automatic loop initialization including adaptation of total loop delay is possible while an arbitrary subset of the system peer stations is active while other stations are disabled or inactive or disconnected.

A further object is a loop system in which each station at which a complete loss of synchronization is detected will start a reinitialization procedure among the active stations connected to the loop.

One more object of the invention is a serial loop fault locating mechanism that allows automatic determination of the location of a fault on the loop which prevents an initialization of the loop operation.

These and other objects are achieved by the invention of which a preferred embodiment is described herein as illustrated in the drawings.

A major advantage of the disclosed system is the possibility to start or restart loop operation with any subset of all possible stations, and the avoidance of a central or monitoring station for loop initialization. Both facts improve the reliability and availability of the peer-to-peer station loop communication system.

BRIEF DESCRIPTION OF THE DRAWINGS

FIGS. 6A, 6B Detailed block diagram of the receiver, control and clocking unit and of the hold register array in the modem;

FIG. 13 Loop configuration for automatic fault localization;

ACRONYMS AND ABBREVIATIONS

Figure 1:
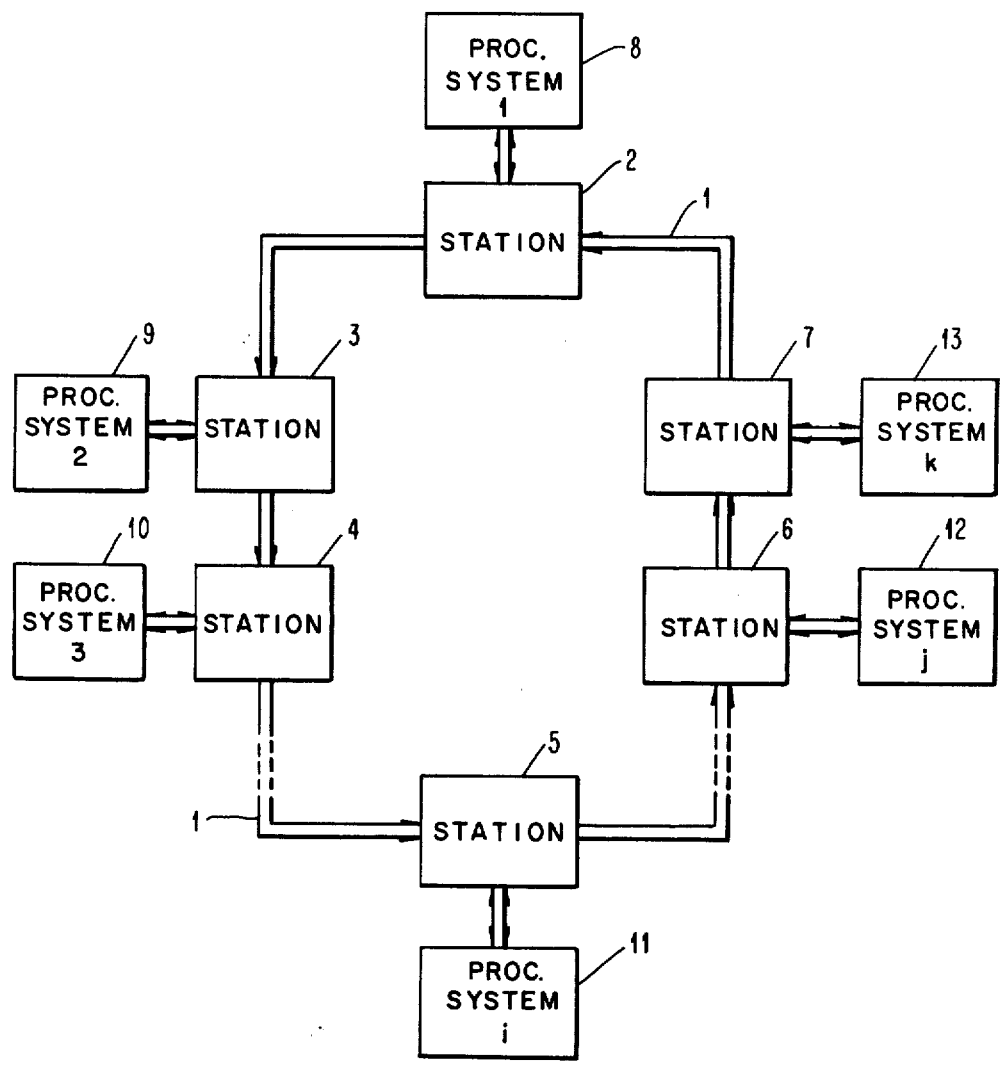
FIG. 1 Configuration of the loop communication system interconnecting a plurality of processing systems.

The following acronyms and abbreviations are used herein:

| | | |
|---|---|---|
| A | — | Frame Available |
| AFD | — | Addressing and Frame Disposition Circuitry |
| AV | — | Availability |
| B | — | Broadcast Frame |
| C | — | Control Field (Byte) |
| CF | — | Control Frame |
| CIC | — | Channel Interface Controller |
| CR | — | Station Receive Sequence Count |
| CRC | — | Cyclic Redundancy Check |
| CS | — | Station Send Sequence Count |
| CSA | — | Control Storage Array |
| CV | — | Code Violation |
| DA | — | Destination Address |
| DCB | — | Device Control Block |
| DCB-ID | — | Device Control Block-Identifier |
| DFF | — | Data Full Frame |
| DPC | — | Direct Program Control |
| DPF | — | Data Partial Frame |
| DSA | — | Data Storage Array |
| DT | — | Data Transfer Function Bits |
| EIPL | — | External Initial Program Load (Also Termed Remote IPL) |
| FIFO | — | First In First Out |
| G | — | Gate |
| HLD | — | Hold |
| HR | — | Hold Register |
| HRA | — | Hold Register Array |
| IDF | — | Initialization Data Frame |
| INFO | — | Information |
| INIT | — | Initialization Status |
| INT | — | Inbound/Outbound Interface Circuitry |
| I/O | — | Input/Output |
| ITF | — | Initialization Termination Frame |
| LBT | — | Local Byte Time |
| LM | — | Link Manager |
| M | — | Match |
| MOD21 | — | Modulo 21 |
| MX | — | Multiplexor |
| NIM | — | Non-Intelligent Mode |
| NOM | — | Normal Operating Mode |
| NS | — | Non-Sequenced Function Bits |
| NSI | — | Non-Sequenced Information Frame |
| NSR | — | Non-Sequenced Response Frame |
| OA | — | Origin Address |
| PDA | — | Destination Address Parity |
| POA | — | Origin Address Parity |
| PTR | — | Pointer |
| R | — | Regulatory Function Bits |
| RBT | — | Received Byte |
| RCC | — | Receiver Clock and Control Circuitry |
| R/F | — | Response Required Final Bit |
| REJ | — | Reject Output (or Input) |
| Remote IPT | — | Same as External Initial Program Load (EIPL) |
| RES | — | Response |
| RIF | — | Request Initialization Frame |
| R=L | — | Received Address Byte = Local Address Byte |
| R<L | — | Received Address Byte is Less than Local Address Byte |
| R>L | — | Received Address Byte is Higher than Local Address Byte |
| RSB | — | Residual Status Block |
| S | — | Sync Byte Indicator |
| SF | — | Status Frame |
| SIF | — | Set Initialization Frame |
| SYNC | — | Synchronization |
| TDM | — | Time Division Multiplex |
| TED | — | Transmitting Encoder and Driver Circuitry |
| VLD | — | Variable Length Delay Storage |
| WQS | — | Work Queue Storage |
| W/R | — | Write or Read |
| X | — | Reserve (Not used) |

DESCRIPTION OF A PREFERRED EMBODIMENT

The specification disclosing a preferred embodiment of the invention is partitioned into seven sections: 1. General facts of the system. 2. Principles and control of frame transmission. 3. Frame types and formats. 4. The station. 5. The modem. 6. Loop initialization and synchronization. 7. Automatic determination of fault location.

1. GENERAL FACTS OF THE SYSTEM

1.1 Definitions

The communication system to be described has a demand-response structure which provides transparency and code independence. Information is transmitted in fixed length units called frames. The physical mechanism that transmits and receives information is called a station. The communication line which carries information from one station to the next is called a link. Frames initiated by a given station to be transferred to another station are called demand frames. On receiving a demand frame or frames, the station must acknowledge the receipt with either a frame called response frame, or another demand frame. Each frame transmitted contains checking information which is used for error detection and subsequent recovery when required. The demand-response approach provides flexibility necessary for conveying procedures to control the transmission of information over different physical communications facilities. On top of the demand-response structure, a structure of command, data, and status is further mapped to provide a protocol between processors. Basic terms used in understanding the remainder of this specification are briefly defined below. More terms will be defined as the document progresses.

Station: A message source and a sync point in the data transmission system.

Link: The data transmission channel that interconnects two or more stations.

Loop or Ring: A link carrying a one way transmission that begins at a given station, traverses through one or more stations, and returns to the given station.

Frame: The basic unit of information transfer from one station to another.

Demand Frame: The information frame initiated by a given station to be transmitted to another station.

Response Frame: The receipt of a demand frame or frames by a station must be countered with an acknowledgement. The acknowledgement frame is the response frame.

Host Processing System: Host Processing system is that unit which is connected to the other side of a station, usually via the channel Input/Output I/O interface of the processing system.

Local Station: The local station to a given host processing system is that unit which is directly attached to the Channel I/O interface of the host processing system. The host processing system physically communicates to all other stations via its local station.

Subchannel: The subchannel is the physical subdivision of a local station which logically forms part of a station elsewhere on the link. It contains the control words and buffering necessary to effect data transfers between the two stations. Each local station contains a subchannel for each station attached to the link.

Device Control Block/DCB: A block of control information residing in a station and containing the current parameters for the operation just executed.

External Initial Program Load/EIPL: A procedure by which the initial program load IPL for one station can be effected from another station upon request. Also termed: Remote IPL.

1.2 Purpose and Basic Structure of the System

FIG. 1 shows the basic structure of a processor intercommunication system in which the invention finds application. A serial loop 1 interconnects a plurality of stations 2, 3 . . . 7. To each station, a host processing system 8, 9 . . . 13 is attached. The processing systems may be of different sizes and structures, and they may be general purpose systems or adapted for a specific application. There is no central station or controller in the system.

Signals on the loop propagate in one direction, as indicated by the arrows, either bit-serial or byte-serial, depending on the requirements of the particular system and the physical link chosen. The specific embodiment described in this specification provides bit serial transmission.

The main purpose of this processor intercommunication system is to provide a single mechanism for high-speed storage to storage data transfer between two or more processing systems or subsystems. It also allows incremental adding of processing power into an overall processing system, thus achieving a fully distributed multi-processing system. It is mainly intended for in-house local interconnections.

1.3 Frame Format

Figure 2:
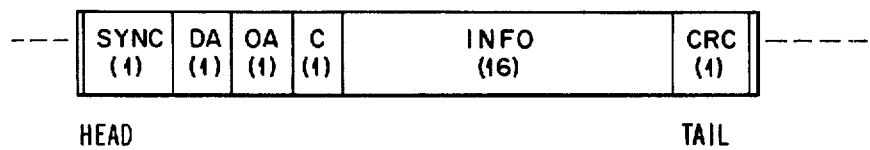
FIG. 2 Frame format of data travelling on the loop.

Data are transferred on the loop in the form of consecutive frames. The format of such a frame is shown in FIG. 2. Each frame comprises twenty-one eight-bit bytes or characters. They contain the following information: Synchronization SYNC (1 byte): The sync field identifies the beginning of a frame. Since frames are continuous, the sync field indirectly identifies the termination of a previous frame. The sync field also indicates accessibility of the frame, i.e. it contains an available/unavailable indication. Details of the sync field are explained in a later section.

Destination Address DA (1 byte): An eight-bit destination address identifying the intended receiving station of the respective frame.

Origin Address OA (1 byte): An eight-bit origin address identifying the originating or sending station of the respective frame.

Control C (1 byte): An eight-bit control field used by the sender of the respective frame to convey its internal state information, or identifying the content category of the information field, e.g., whether the information field contains status, response, instructions, or data. It also contains information pertaining to the extent in which the information field is filled. More details about the control field functions will be given in a later section.

Information Field INFO (16 bytes): The information field comprises 16 bytes containing either data, status information, or control information. In some frames, this field may be empty or partially filled depending on the specification of the control field.

Cyclic Redundancy Check CRC (1 byte): A check character generated from the contents of the four fields DA, OA, C, and INFO.

The sync character SYNC and the check character CRC are physical frame parameters. The other four fields, i.e. DA, OA, C, and INFO, contain logical frame parameters. The physical frame parameters are those parameters that are technology dependent and are used to validate and extract the logical frame parameters. They vary with the specific system implementation chosen. Only one embodiment example will be described in this specification, though many others are possible.

2. PRINCIPLES AND CONTROL OF FRAME TRANSMISSION

2.1 Addressing Convention

Recognition of a valid destination address and a valid origin address is required by the receiving station prior to the acceptance of a frame.

A station must accept at least two different destination addresses. One of the addresses is a broadcast address. The broadcast address may not be used in the Origin Address field. The other address is the address or addresses assigned a given station which must uniquely identify that station on the link. The address uniquely identifying the station on the link is said to be the station address. The station having either data or responses to transmit under normal operation mode must use the appropriate station address.

2.2 Station Modes

Normal Operating Mode NOM

Normal Operating Mode NOM is the station operational mode for information interchange. Being in NOM mode implies that this station is "up and running", i.e., the processing system is connected and may intelligently send or receive messages.

Non-Intelligent Mode NIM

Non-Intelligent Mode NIM is the mode where the station has a machine malfunction and hence has to be reinitialized, or the station and the attached processing system has just been powered up, or the processing system has yet to be initialized. All frames, except for a Set Initialization Frame SIF (cf. Section 3.4) received while the station is in NIM mode will be ignored. The response for these frames received will be a broadcast Request Initialization Frame RIF (cf. Section 3.4). The station exits NIM mode to NOM mode on receiving any command from the I/O interface. The station's modem, however, will evaluate all frames for achieving and maintaining synchronization (even in NIM mode).

2.3 Transmit/Receive Procedure

There has to be an orderly procedure to determine when each station in the loop can output messages onto the loop: otherwise, the transmission would be garbled. The procedure goes as follows:

The station transmits the information provided by the attached processing system only if the station has declared to be in synchronization.

The station transmits only on frames that either are marked as available, or have their destination address/origin address equal to the station address. Frames transmitted by this station must be marked as unavailable if the station has inserted information.

Frames arriving at the station having their destination address or origin address equal to the station address will be re-marked as available if the station has no information to transfer.

The station always listens to information arriving on the link. Information is peeled off only when the destination address equals the station address.

A demand frame or frames transmitted must be responded to with either another demand frame or a response frame.

2.4 Invalid Frame

An invalid frame is one that is received in one of the following conditions: (a) It is received during un-synchronized state, (b) when the check character declares the frame just received to be invalid, or (c) when the frame is perceived to contain code or modulation violations in areas other than sync character location. All invalid frames received will be discarded with no further examination.

2.5 Frame Synchronization

A station is considered synchronized when the station can correctly predict the arrival of the synchronization character and the check character. Furthermore, the check character must be able to declare the frame to be free of error.

The procedure for synchronization is as follows:
(a) A sync counter which counts modulo 4 (from zero to 3) is initialized to zero.
(b) The sync character detection circuitry continuously scans the input bit stream for the sync code. If the sync counter value is less than 3, each sync character detected causes the CRC to be compared for a valid frame. A valid frame detected causes the sync counter to be incremented by 1. An invalid frame detected causes the sync counter to be decremented by 1. This process continues until the sync counter equals 3 or 0.
(c) When the sync counter equals 3, the station is to be in frame sync. Frame sync is maintained if valid sync characters are received at proper time intervals.
(d) When the sync counter equals 0, the station is said to be out of frame sync.

More details on the frame synchronization procedure are given in section 6.

2.6 Sync Field/Signal Format

Figure 3A:
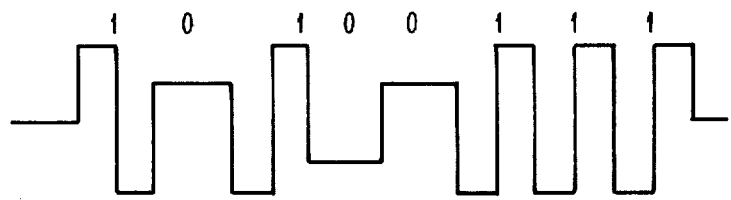
FIGS. 3A, 3B, 3C Signal waveforms of an arbitrary byte and of sync characters on the loop.
Figure 3B:
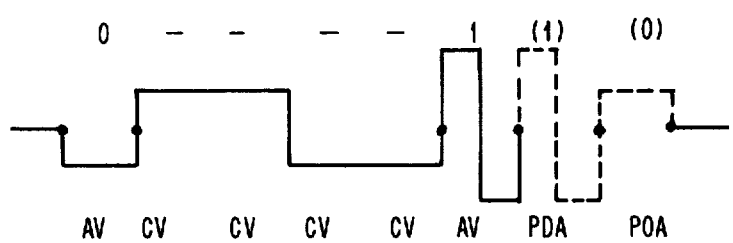
Figure 3C:
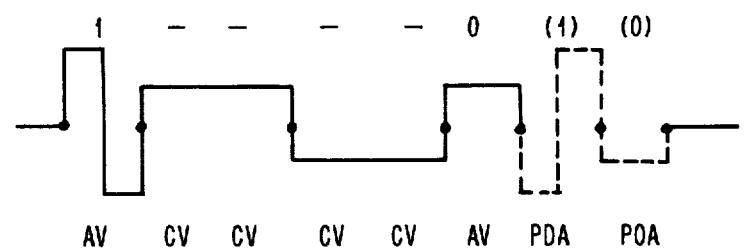

The eight bits of a sync field have the following functions:

| Bit No.:  | 0  | 1  | 2  | 3  | 4  | 5  | 6   | 7   |
|-----------|----|----|----|----|----|----|-----|-----|
| Function: | AV | CV | CV | CV | CV | AV | PDA | POA | where
AV = availability bit (pair 01 = available, pair 10 = unavailable)
CV = code violation bit
PDA = destination address parity
POA = origin address parity As shown, the actual sync information occupies bits 1-4 of the sync character, while the frame availability information is provided in bits 0 and 5. Bits 6 and 7 are parity check bits for the two address fields Destination Address DA and Origin Address OA. If a bifrequency signal format is used as shown in FIG. 3A, the appearance of sync characters with either available or unavailable indication is as shown in FIGS. 3B and 3C. The unique violation of the bifrequency format in bit positions 1 . . . 4 is easily recognizable.

3. FRAME TYPES AND FORMATS

3.1 Control Field Functions

The control field specifies one of three demand or response frame types: Data Transfer, Regulatory, and Non-Sequenced. The formats of the control field for these three frame types are as follows:

| Bit Assignment | C0 | C1  | C2 | C3  | C4 | C5 | C6 | C7 |
|----------------|----|-----|----|-----|----|----|----|----|
| Data Transfer  | 0  | I/O | DT | DT  | CS | CS | CR | CR |
| Regulatory     | 1  | 0   | R  | R   | CS | CS | CR | CR |
| Non-Sequenced  | 1  | 1   | RE | R/F | NS | NS | NS | NS |

The various bits have following functions:

CS = Station send sequence count:

This is a two bit counter that is used to number all frames transferred under the normal operating mode. This numbering allows for transmission of up to 3 contiguous frames prior to receiving responses for these frames. It is also a means for error detection and recovery.

CR = Station receive sequence count:

This is a two bit counter used in conjunction with the CS count for error detection and recovery. The numbering is used only under normal operating mode.

I/O = Input/Output bit:

This bit is used to associate the frame transmitted with the operation currently residing in the station. A logical zero indicates input, while a logical one indicates output.

DT = Data transfer function bits:

These bits are used to define four types of data transfer frames.

RE = Reserve bit.

R = Regulatory function bits:

These bits are used to define four types of regulatory frames. These regulatory frames are used to regulate data transfer across stations.

NS = Non-sequenced function bits:

These bits are used to define frames operating under initialization state, abnormal condition states, etc.

R/F = Response required final bit:

The R/F bit is used in non-sequenced formatted frames to solicit responses. Since non-sequenced frames, except those that are intended for initialization, are passed directly to the system programs above, it therefore is the function of the system above the station to provide proper response to frames containing the final bit.

3.2 Data Transfer Format

The data transfer frames are primarily the frames used to carry messages from one processing unit to another. They are also used to carry the control and the status messages concerning the transmit and the receive stations. All data transfer frames are considered to be demand frames.

The data transfer format may be used only under the normal operating mode. There are four data transfer frame formats possible. These include:

| Data Transfer Frames | C2 | C3 |
|----------------------|----|----|
| Data full frame = DFF    | 0 | 0 |
| Data partial frame = DPF | 0 | 1 |
| Control frame = CF       | 1 | 0 |
| Status frame = SF        | 1 | 1 |

Data Full Frame DFF format indicates that the information field is filled with 16 bytes of data. Message transfer always begins with DFF frames unless the message is less than 16 bytes. The I/O bit must be equal to a logical one for the DFFs.

Data Partial Frame DPF format indicates that the information field has less than 16 bytes of data. The first two bytes of the information field contains a byte count indicating the toal number of data bytes in the information field. The data may be less than 16 data bytes but the frame must still be stuffed, with logical zeros if necessary, to make up a 16 byte field. The I/O bit must be equal to a logical "one" for the DPF sent.

The Control Frame CF format is intended for initiating a transfer between stations. Instead of containing data as in DFF and DPF, the information field contains 16 bytes of control information.

The I/O bit in this case should be a logical "zero" for "read op" and a logical "one" for "write op". Commands are transferred or re-transferred from the processor under the control frame.

The Status Frame SF format is used as a response concerning acceptance or non-acceptance of the demand made in a control frame. The SF format is also used for station status exchange in the termination of data transfer. In both cases, the status frame is used to provide station status information to the corresponding station engaged in a data exchange, or wishing to make a data exchange, i.e. proceed with exchange. The status information is contained in the first byte of the information field. The subsequent bytes contain logical zeros.

The I/O bit should be a logical "zero" if the status frame is initiated due to a "read op" resident in the sending station, and a logical "one" if the status frame is initiated due to a "write op" resident in the sending station. For cases where a status must be provided but no specific read or write op is active, the first byte (byte 0) of the information field INFO in a status frame is formatted as follows:

| Bits | | | | | |
|---|---|---|---|---|---|
| 0 | 1 | 2 | 3 | 4 | |
| 1 | | | | | Sequence Check |
|   | 1 | | | | Data Check |
|   |   | 1 | | | Byte Count LO |
|   |   |   | 1 | | Byte Count HI |
|   |   |   |   | 1 | Hardware Error |

| Bits | | | |
|---|---|---|---|
| 5 | 6 | 7 | |
| 0 | 0 | 0 | Normal |
| 0 | 0 | 1 | Station Busy |
| 0 | 1 | 0 | Operation Reject |
| 0 | 1 | 1 | Valid Frame, Station Subchannel Inactive |
| 1 | 0 | 0 | Non-Sequenced Received, no active DCB |
| 1 | 0 | 1 | Non-Sequenced Frame Terminate, with active DCB |
| 1 | 1 | 0 | Sequenced Read Request w/o DCB |
| 1 | 1 | 1 | Sequenced Write Request w/o DCB |

Sequence Check implies that a protocol sequence error had occured on the link and is not to be confused with sequence count errors which are data check errors.

Data Check implies that data did not arrive at the intended station correctly, hence no response was received for the data frame or frames sent within the time out limits. Data Check is brought up only after the passage of the control sequence for the command transfer.

Byte Count Lo implies that the data byte count specified in the DCB is less than that received.

Byte Count Hi refers to the condition where the data byte count specified in the DCB is more than that received in the data transfer.

Operation Reject refers to the condition where both stations attempting to provide an exchange are given an incompatible set of commands, e.g., Write command in station A, and Write command in station B.

Hardware Error refers to a hardware error encountered in the local station while making an exchange.

Station Busy refers to the condition where the station has received a command frame from another station prior to the posting of the current DCB.

Non-Sequenced Frame Terminate refers to the condition where the station received a non-sequenced frame while in the midst of data frame transfer, hence terminating the data transfer DCB residing within the station.

Sequenced Read Request without a DCB refers to the state where an outstanding read request was received from a station on the loop and no DCB is presently active in the station to direct proper interaction required of the Read request.

Sequenced Write Request without a DCB: Like the status code point above this status decode refers to a write request instead.

Non-Sequenced Received No Active DCB: Like the status code point above, this refers to a non-sequenced frame instead.

Valid Frame, Subchannel Inactive implies that either an SIF was received by a station configured for station-to-station external initial program load EIPL or any valid frame except SIF was received while the station is in NOM mode with the subchannel inactive.

3.3 Regulatory Format

The regulatory format, as the name implies, is used to regulate information flow between stations involved in an exchange. The regulatory format hence is used in conjunction with the data transfer frames operating under the normal mode. The four types of regulatory frames are:

| Regulatory Frames | | C2 | C3 |
|---|---|---|---|
| Reject Output | = REJ | 1 | 1 |
| Reject Input | = REJ | 1 | 0 |
| Hold | = HLD | 0 | 1 |
| Response | = RES | 0 | 0 |

A Reject REJ frame is used by the receiving station to return an error sequence indication prior to the "link up" between the two stations for data transfer. An example is the receiving of a data frame prior to the station being primed with a Device Control Block DCB. Reject Output is issued with respect to an output operation received while Reject Input is issued against an input operation received.

A hole HLD is for the purpose of indicating a temporary backup condition within the station. The usual problem is the lack of buffer space or inability of the processing unit to respond to the data accumulated within the station. The station that has been given a Hold will wait for a response frame prior to continuing the data transfer.

A "Response" frame is used to denote that the station has received data and that the data frames previously received as indicated by the sequence count are in good condition.

The information field in a regulatory frame is ignored.

3.4 Non-Sequenced Format

The non-sequenced format is intended either for direct processor-to-processor communication with little or no intervention on the part of the station, or for system initialization. It will be used for processor-to-processor control transfer. There are no sequence counts associated with each frame transferred. If a response is required by the sender, the non-sequenced frame transmitted by the sender must have the Response Required Final bit turned on. The receiver, or the receiving processor must, in this case, provide a response. The non-sequenced format is intended for system use, not for the applications programmer.

The station in receiving a non-sequenced frame except for the Initialization Data Frame will transfer the Origin Address field, the Control field and the entire data field to the host attachment or processing system. The non-sequenced formats are:

| Non-Sequenced Frames | | C4 | C5 | C6 | C7 |
|---|---|---|---|---|---|
| Initialization Data Frame | = IDF | 0 | 0 | 0 | 0 |
| Set Initialization Frame | = SIF | 0 | 0 | 0 | 1 |
| Request Initialization Frame | = RIF | 0 | 0 | 1 | 0 |
| Non-Sequenced Information Frame | = NSI | 0 | 1 | 0 | 0 |
| Non-Sequenced Response Frame | = NSR | 0 | 1 | 0 | 1 |
| Initialization Termination Frame | = ITF | 0 | 0 | 1 | 1 |

Initialization Data Frame IDF is used only when the station is reserved for EIPL (station-to-station external initial program load). The IDF is the only non-sequenced format frame where only the information field is transferred to the processor storage. The station receiving IDF is presently operating under NIM mode. Should this frame be received under NOM mode, the station will pass the frame to the processor as if it were a non-sequenced information frame NSI.

Set Initialization Frame SIF is used for EIPL allowing the EIPL host to notify the intended stations that EIPL procedure will start. There is no data field associated with this frame.

Request Initialization Frame RIF is the response frame generated by the station when confronted with demand frames prior to EIPL. RIF is also the demand frame resulting from IPL at power on and the encountering of any frames except initialization frames while in NIM mode. The only time the RIF is in use is while the station is in NIM mode. There is no data field associated with this frame. The receiver of this frame, being in NOM mode, will pass the frame to the processor as if it were an NSI frame.

Non-Sequenced Information Frame NSI is used for processor-to-processor communication without having to go through the normal data path. Depending on the host attachement's channel interface structure, the NSI frame may be transferred to the processor through data paths other than the normal cycle steal path.

Non-Sequenced Response Frame NSR is used as a response frame to a non-sequenced frame when the Response Required Final bit is encountered. There need not be a data field associated with this frame.

Initialization Termination Frame ITF is the last frame to be transferred in an initialization sequence. ITF is used to signal the station that all required initialization data has been transferred. There is no data field associated with this frame.

It should be noted that the term "initialization" in this section means loading of IPL data into a station's storage to enable its operation. This is different from loop initialization in which only the station modems are involved and which is necessary to get stations synchronized with loop operation, but does not involve the exchange or loading of data.

4. THE STATION

4.1 Basic Structure and Component Functions

Figure 4:
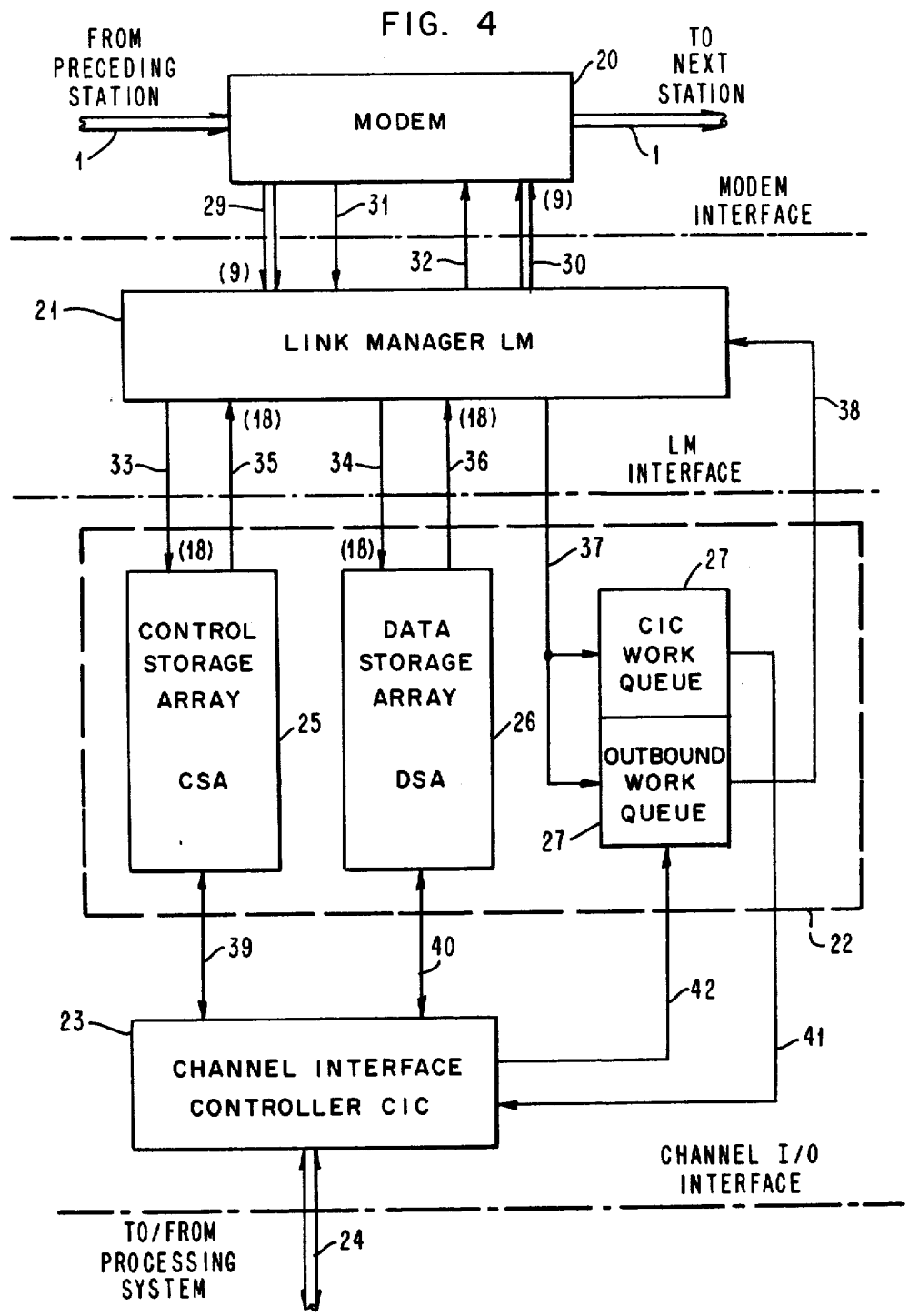
FIG. 4 Block diagram of a station connecting a processor system to the loop.

Each of stations 2 ... 7 of FIG. 1 is partitioned into four functional sections, namely a Modem 20, a Link Manager LM 21, a Storage Section 22, and a Channel Interface Controller CIC 23 as shown in FIG. 4. Channel Interface Controller 23 is connected to an I/O channel of the attached processing system by Channel Bus 24. Modem 20 is connected into communication loop 1 which is also termed "link" in the following.

Modem 20 handles technology dependent functions such as:
Information coding and modulation,
Link drive and receive,
Frame synchronization and data insertion,
Clock extraction,
Frame and data checking at the link level,
Link initialization and available frame insertion.
The Modem is described in more detail in section 5.

Link Manager LM 21 provides logical frame management functions such as:
Frame Structuring,
Address decode and encode,
Control field encode and decode,
Data blocking and deblocking,
Physical interface protocol sequencing and checking,
Data pacing.

Channel Interface Controller CIC 23 is the mechanism which interfaces the station with the processor I/O channel. It provides 16 subchannels for communication with up to 16 stations, and further provides functions such as:
Synchronizing with the channel I/O interface for data transfer,
Presenting the station logical interface to the processor,
Multiplexing control required amongst the 16 subchannels,
Device address mapping between the processor I/O interface and the station address.

Storage Section 22 comprises the following units: a Control Storage Array CSA 25, a Data Storage Array DSA 26, and Work Queue Storage WQS 27 for a CIC work queue and an outbound work queue.

Modem 20 and Link Manager 21 are interconnected by Inbound Data Bus 29, Outbound Data Bus 30, Control Lines In 31 and Control Lines Out 32.

Link Manager 21 and Storage Section 22 are interconnected by Control Array Input Bus 33, Data Array Input Bus 34, Control Array Output Bus 35, Data Array Output Bus 36, and further by Work Queue Bus In 37 and Work Queue Bus Out 38.

Channel Interface Controller CIC 23 is connected to CSA 25 by Control Store Bus 39, to DSA 26 by Data Store Bus 40, and to WQS 27 by Queue Output Bus 41 and Queue Input Bus 42.

As indicated in FIG. 4, there are three important interfaces in the station: The Modem Interface between Modem 20 and Link Manager 21, the Link Manager Interface between Link Manager 21 and Storage Section 22, and the Channel I/O Interface between the Channel Interface Controller and the host processing system's I/O channel.

4.2 Operation and Data Flow of Stations

It is the task of each station to allow any required exchange of data and commands between its attached local host processor and all other processors in the system which are attached to other stations. Simultaneous information exchange between one processor and several other processors must be possible, so that for example processor A can transmit data to processor B and C while it receives commands from processor D.

The modem is the front-end that does the link access and blends out all technological and topological characteristics of the link mechanism. It does all synchronization and timing with respect to transmission on the link, CRC checking of frame contents, and determines whether data must be transferred from the link to the local host processor, and whether data from the local host processor can be dispatched on the link.

In each station, all other stations are treated as subchannels. The local station maintains a table (32 bytes) of status data for each of the other stations or subchannels in the control storage array of the storage section. For each transaction, i.e. receipt or transmission of information to or from another station, the Link Manager consults and updates these tables.

During transfer from processing system to the link or vice versa, data are buffered in the data storage array of the station. Each subchannel, i.e. each remote station, has a dedicated area in the data storage array of a local station.

As not all transactions can be executed simultaneously, pointers for waiting tasks are put into the outbound work queue and CIC work queue, and are removed from these queues sequentially.

The work queues are also the communication means between the Link Manager and the Channel Interface Controller.

For each frame received, the Link Manager uses the origin address to access the control storage array associated with the subchannel. It contains the information which allows the LM to determine:
If the subchannel is primed for the type of information contained in the frame.
If the station which originates the frame is ready for more data.
If the subchannel is in the appropriate operating sequence.
If the data buffers are available for data message handling.

The control byte in a frame indicates if the frame type is a Data Transfer, Regulatory, or Non-Sequenced Frame. When compared with the control array contents the LM can determine:
If the data is to be transferred to the attached host processing system.
If a response is appropriate.
If the data frames transferred have been received in the correct sequence.

With respect to an inbound frame, the primary functions of the Link Manager are to determine the validity of the current frame received, the request embodied in the current frame, the necessity of a response to the request, and proper shoulder tapping to the outbound work queue or the CIC work queue. Upon recognition of an incoming frame destined for the local station, the Link Manager decodes the type of frame and compares the result to the contents in the control array for determination of the type or request to make to the outbound work queue or CIC. It is the responsibility of the Link Manager to set up station information in the station status field of the control array for error condition reporting. The Link Manager checks the contents of the subchannel CR bits against the incoming frame CS bits for send or receive sequence number errors. The final response to a demand frame is made during the next frame cycle to allow time for error detection in the control information or data associated with the most recent frame received.

Initiative to transmit an outbound frame comes from the outbound work queue. When there is work in the queue, the LM accesses the queue at a predetermined time to obtain the necessary information. The times that the LM accesses the work queue are fixed, based on the byte time of each byte to be transmitted to the modem.

Information is placed into the queue by both the LM and CIC, and is accessed in First In First Out FIFO order. There is a maximum of 16 queue entries, with each entry containing 4 bytes of information.

With respect to an outbound frame the primary function of the Link Manager is to transfer the frame in proper sequence and report any error conditions resulting from the frame transfer.

An outbound frame transfer is initiated by the Link Manager. Whenever there is work in the outbound work queue and the Link Manager is in a position to transfer a frame, it issues a Request Frame Transfer (Local Transmit Request) to the modem. When the modem is ready to begin accepting the frame, it issues a Start Outbound Frame. Once the frame transfer starts, the Link Manager out-gates each byte of the frame at the Outbound Data Bus rate. When the last byte of information is gated out, the Link Manager issues a Last Outbound Byte Signal, indicating that the last byte for this frame transfer is on the Outbound Data Bus.

In order to prepare to transmit an outbound frame, the Link Manager obtains the necessary control information from the out-bound work queue. This byte contains all the necessary information to control the outbound frame transfer. The destination address byte and the control field byte are also contained in the outbound work queue.

The Channel Interface Controller CIC formats three particular frame requests for the outbound work queue. A control frame request is formatted and placed into the queue whenever a read/write command is to be transmitted, as a result of fetching a new DCB. A non-sequenced frame request is formatted and placed into the queue whenever a non-sequenced frame is to be transmitted. A response frame request is formatted and placed into the queue whenever a response is to be transmitted, in order to clear a hold condition.

The Link Manager LM formats and places all types of frame requests into the queue, except those specific frames mentioned above. The LM formats and places into the queue all frame requests which result from a time out. When a data frame is to be transmitted, there is a certain amount of interlocking between the LM and CIC, before the request is placed into the outbound work queue. This interlocking insures that a data frame is not transmitted before data is placed into the data buffer. Whenever the LM determined that a data frame should be formatted, it formats bytes 0, 1, and 2 of the outbound work queue, and also formats a fetch data request to the CIC. These 4 bytes of information are placed into the CIC work queue. When the CIC fetches the data and places it into the appropriate data buffer, the three bytes of information required by the outbound work queue are then transferred from the CIC work queue into the outbound work queue.

The Link Manager maintains a 20 byte counter in order to synchronize the frame transfer between the Link Manager and the modem, and to control its internal sequencing. In order to insure that each byte is transferred at the proper time, this counter is synchronized, once every frame time, with the modem. At a specified byte time, the modem sends a signal to the Link Manager, which is compared with the sequence counter. If there is a mismatch, the Link Manager takes appropriate action to insure that erroneous data is not sent out on the link or to the host processor.

In the event the modem loses sync, it sends a signal to the Link Manager, indicating that this condition exists. The Link Manager will continue to step the sequence counter, until a specified value is reached. At this time the counter is stopped until the Link Manager and modem can re-establish sync, before a re-start.

A frame retry mechanism is implemented in the Link Manager. A frame may be retried three times before the subchannel DCB is terminated with an error status. The components of the retry mechanism are a time-out stack, capable of simultaneously keeping track of time-outs for the 16 subchannels, and a retry count, located in the control storage array.

Whenever a Data Transfer type frame is transmitted, the time-out for that subchannel is started. When a response is received for that frame the time-out is stopped. However, if no response is received within 64 milliseconds, the time-out is flagged and the Link Manager will initiate a retry. Whenever a retry is initiated, the retry count is incremented by one.

The Link Manager performs three operations on the time-out stack in order to control the starting and stopping of time-outs. When a response frame is received by the Link Manager and there are no other frames outstanding on the Link, for a given station, the time-out is stopped. When a response frame is received by the Link Manager and there are more frames outstanding on the link, for a given station, the time-out is restarted in order to account for the frames still outstanding on the link. When a data transfer type frame (DFF, DPF, Status, Control) is transmitted and there is no time-out in progress for a given station the time-out is started by the Link Manager.

5. THE MODEM 5.1 Survey of Modem

Modem 20 is provided for masking out the physical network characteristics and to synchronize the information transfer on the loop. Its function include interfacing with the physical loop network, interfacing with the Link Manager, delimiting of frames, and initialization and error checking of all frames.

The Modem examines each frame for disposition in one of the following ways:

(a) The frame is forwarded unaltered for reception by another modem.

(b) The frame is received and interpreted.

(c) The frame is replaced by another frame intended for another modem.

Figure 5:
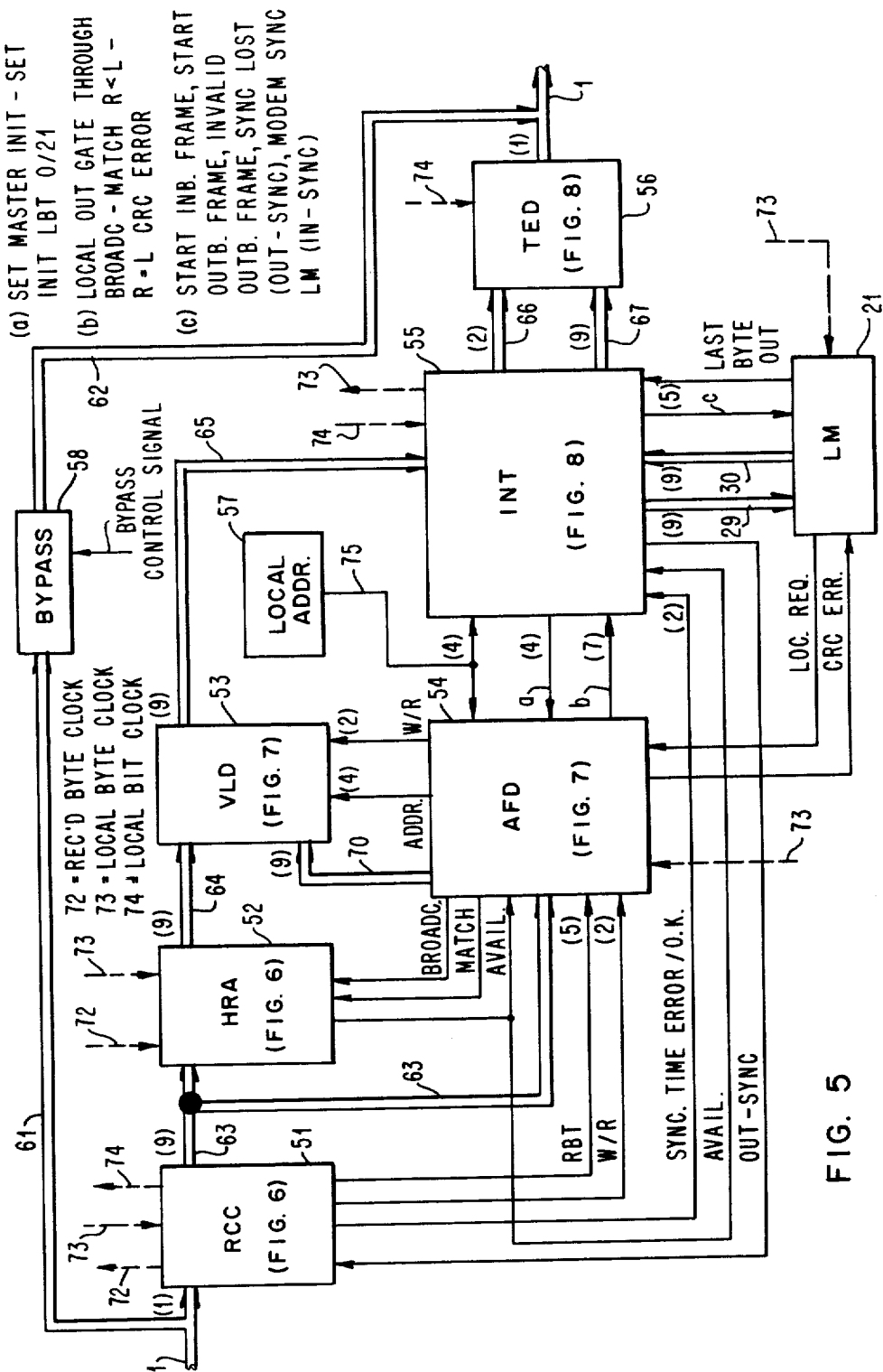
FIG. 5 Block diagram of the modem in a station.

FIG. 5 is a functional block diagram of Modem 20 showing the flow of data and control signals. Link Manager 21 is also shown in FIG. 5 for illustrating its interconnection with Modem 20 over the Modem Interface. Modem 20 comprises the following functional blocks:
Receiver Clock and Control Circuitry RCC 51,
Hold Register Array HRA 52,
Variable Length Delay Storage VLD 53,
Addressing and Frame Disposition Circuitry AFD 54,
Inbound/Outbound Interface Circuitry INT 55, and
Transmitting Encoder and Driver Circuitry TED 56.
A Local Address Selector Switch 57 is provided for manually setting each station's address.
A bypass circuit 58 is also provided.

Interconnections are represented as follows: Main data paths by double lines, control paths by single lines, and clock or timing paths by dashed lines. The actual number of parallel bit lines in each of these connections is indicated by a digit in parenthesis, if it is more than one.

The bit-serial link or loop 1 is connected at the modem input to RCC 51 and at the modem output to TED 56. Single-bit bypass lines 61 and 62 together with Bypass Circuit 58 constitute a bridge between input and output of the modem.

The modem internal main data path is nine bits wide and includes section 63 connecting RCC 51 and HRA 52, section 64 connecting HRA 52 and VLD 53, and section 65 connecting VLD 53 and INT 55. Between INT 55 and TED 56, there are provided a 2-bit wide path 66 for serialized data, and a 9-bit wide path 67 for sync character information. INT 55 and Link Manager 21 are interconnected by the two directional 9-bit wide data paths 29 and 30. Between VLD 53 and AFD 54, there is provided 9-bit wide path 70 for sync byte data updating. AFD 54 is also connected to RCC 51 by a branch of data path 63.

Three clock lines are provided for carrying clock signals between sections: line 72 for a Received Byte Clock from RCC 51 to HRA 52, line 73 for a local Byte Clock from INT 55 to RCC 51, HRA 52, AFD 54, and Link Manager 21, and line 74 for a Local Bit Clock from RCC 51 to INT 55 and TED 56.

A 4-bit data path 75 is provided between Local Address Selector 57, and AFD 54 and INT 55.

All control lines between the different functional sections of FIG. 5 are identified by abbreviations for the signals they carry, and are not given individual reference numbers in FIG. 5. Their meaning will be explained in more detail in later sections.

The functional sections of modem 20 as shown in FIG. 5 will be described in more detail in connection with block diagram figures as indicated in parenthesis in the block for each section.

The main functions of these sections are listed below as a survey:

Receiver Control and Clock Circuitry 51 RCC

Detect sync characters
Derive received clock, and provide received byte count and received byte timing signals
Generate local clock, and adapt its rate to received clock
Recognize and deserialize incoming data bytes
Check correct mod. 21 arrival of sync characters
Provide READ and WRITE half cycle signals

Hold Register Array 52 HRA

Store two consecutive received bytes
Adapt byte stream between received clock rate and local clock rate
Gate received data to VLD
Convert sync character contents to sync byte data for input to VLD

Variable Length Delay Storage 53 VFD

Store a window of the data stream comprising several bytes to obtain a required delay
(Minimum delay = 3 byte periods)

Addressing and Frame Disposition Circuitry 54 AFD

Derive delay pointer (for variable length delay)
Generate addresses for VLD to achieve required delay, and store display pointer
Update sync character as determined by sync update signal
Compare incoming bytes to local address, to obtain signals for R=L, R<L, OA=L, DA=L
Decode incoming destination address DA to detect broadcast frame
Accumulate CRC for incoming frames and indicate any CRC error for unavailable frames
Determine disposition of incoming frames, to generate control signals for:
updating available/unavailable indication
gating through received frames
gating inbound data to Link Manager
gating outbound data from Link Manager to transmit section
Pass on READ/WRITE signals from RCC to VLD

Inbound/Outbound Interface Circuitry 55 INT

Provide local byte count and local byte timing signals from local clock signal
Gate data from VLD to transmit section or to Link Manager
Assemble outbound data stream (frames) from several sources
Insert local address, and generate and insert CRC character during initialization and for local outbound frames
Check validity of local outbound frames
Convert sync from VLD into sync character data
Serialize all outgoing bytes
Provide sync/resync procedure and a flywheel check procedure
Store status "in-sync" or "out-of-sync"
Detect temporary master status
Store status "initialization", "temporary master", "temporary slave" during loop initialization

Transmitting Encoder and Driving Circuitry 56 TED

Generate encoded signal from serialized data, including sync character with code violation from sync character data

Modem Interface Lines

The Modem Interface between Modem 20 and Link Manager 21 is characterized by transfer lines for following signals:
(a) Modem to LM:
Inbound Data (9 parallel bits)
Local Byte Clock
CRC Error (Invalid Inbound Frame)

Start Inbound Frame
Start Outbound Frame
Invalid Outbound Frame
Sync Lost (Link Invalid Sync)
Modem Sync LM (b) LM to Modem:

Outbound Data (9 parallel bits)
Local Transmit Request
Last Outbound Byte

5.2 Basic Operation of the Modem and Data Flow

The modem's operating procedure for receiving and transmitting data will now be described in connection with FIG. 5. Data are transmitted on the loop in serial form as shown in FIG. 3A. Receiver Control and Clock Circuitry RCC 51 detects waveform conditions and signal changes on the link and decodes the sequence of states into a sequence of 0 and 1 bits. These are accumulated in a Deserializer of RCC to obtain parallel bytes.

A complete byte will be shifted from the Deserializer Register of RCC 51 to a first Hold Register HR1 of Hold Register Array HRA 55, and subsequently to a second Hold Register HR2 of HRA. Using received clock for HR1 and local clock for HR2, this allows to adapt the data stream from one clock to the other.

From HR2, each byte is transferred to the Variable Length Delay Storage VLD 53 which is a buffer store for keeping data bytes for a selected time interval to achieve a desired delay. A read and a write control signal are furnished to VLD 53 at appropriate times. The number of bytes which are simultaneously kept in VLD 53 depends on the selected delay.

Addresses for accessing (writing or reading) VLD 53 are furnished by Addressing and Frame Disposition Circuitry AFD 54. The generation of these addresses, the delay selection, and the frame disposition mechanism are described in section 5.4.

Data bytes read out of VLD 53 after the appropriate delay are sequentially placed on bus 65.

If the data, i.e. logical frame parameters Destination Address, Origin Address, Control Byte, and Information Field received in a frame are to be transferred to the respective station, (i.e., if destination address matches local address, or if it is a broadcast frame) Inbound/Outbound Interface Circuitry INT 55 will be conditioned to gate them from bus 65 to bus 29 for transfer to the station's Link Manager LM 21.

If no outbound data are to be transferred from the station to the link, bytes on bus 65 will be converted to 2-bit groups by INT 55, gated on transmit data lines 66 to Transmitting Encoder and Driver TED 56 and then applied to the link bit-sequentially in the form of an encoded signal as shown in FIG. 3A.

Such reserialization of received bytes and transfer to the link is effected in two situations:

(a) When the received frame is to be passed on to the next station without change (frame unavailable, Destination Address not matching), (b) When data (logical parameters) in the received frame where stripped off and transferred to the respective station (Destination Address matching). In this case, however, the frame is changed from unavailable to available by appropriate marking in the Sync Character, as will be explained in a later section.

If outbound data are ready for transmission in the station's Link Manager, and if the frame was either marked available or was addressed to the respective station, Inbound/Outbound Interface Circuitry 55 will be conditioned to accept these data on bus 30, convert them to a sequence of bit pairs and gate them to transmit data lines 66 for transfer to TED 56 from where it is transmitted on the link. In this case, data bytes on bus 65 will not be used and are thus destroyed. CRC character information and also the local station address (i.e. the origin address) will be furnished by INT 55.

Sync Character Handling

The syn character received as head of each frame is handled different from the other characters, because it comprises the code violation. The sync byte stored in VLD 53 is different from the received syn character.

The code violation which is an unnormal state sequence extending over four bit periods as shown in FIGS. 3B and 3C is recognized by the circuitry in RCC 51. This results in a respective signal on one of lines 63 to HRA 52. This indication is passed on through HRA 52 over lines 64 to VLD 53. The actual sync byte stored in VLD 53 in response to the received sync character has the following format:

| Bit No. | 0 | 1 | 2 | 3 | 4 | 5 | 6 | 7 | P |
|---|---|---|---|---|---|---|---|---|---|
| Function | X | X | X | B | PDA | POA | M | A | S |

Function designations have the following meaning:
X = Not used (reserve)
B = Broadcast frame (Received Destination Address is broadcast address)
PDA = Destination Address Parity (as received)
POA = Origin Address Parity (as received)
M = Match (Local Address matches with Destination Address)
A = Frame Available (Availability Bit as received)
S = Sync Byte Indicator (occupies parity bit position)

The Broadcast and Match indicators B and M are derived in AFD 54 as will be explained later. The final coded sync byte is then furnished on lines 64 for storage in VLD 53. It may be updated by information presented on lines 70 from AFD 54.

The sync byte is not transferred from VLD 53 to the station. However, for frames to be passed on from VLD 53 to TED 56, the sync byte is read out over bus 65 to INT 55 which transfers the respective information (Availability, DA parity, OA parity) over lines 67 to TED 56. The latter generates from this information the sync character to be transmitted over the link, including code violations, as shown in FIGS. 3B and 3C. For frames carrying outbound data from the respective station, sync character information is transferred to AFD 54 and then used to update the sync byte via lines 70 in VLD 53. (Non-available/available indication, DA and OA parities). It is later transferred to TED 56 which then generates the sync character signal.

Cyclic Redundancy Check CRC

A cyclic redundancy check is made for each received frame in AFD 54. Over 19 bytes of each frame, i.e. the logical frame parameters (DA, OA, C, INFO), AFD 54 accumulates CRC data in respective circuitry. When the 20th byte (CRC character) is received, it is combined with the CRC data of the frame. A check is then made—if the frame was unavailable—whether a specific bit pattern is present. If this is not true, an error indication is transferred to Link Manager 21.

For outbound data from the station, INT 55 accumulates a CRC character over the 19 logical frame parameter bytes. It then adds the accumulated CRC character as 20th byte of the frame to the data stream transferred to TED 56.

Modulo 21 (Mod. 21) Count and Byte Timing

As was mentioned already, there exist two clocks in each modem: a Received Clock and a Local Clock. The basic clocks are generated in RCC 51 from the received data and from a local oscillator, and the clock rates are adapted to each other by occasional skipping of pulses in one of the clocks, as will be explained in a later section.

Two byte timing and modulo 21 counting units are provided in the modem: one in RCC 51 for the Received Clock, and one in INT 55 for the Local Clock. Their patterns are the same but they have a phase shift which corresponds to the delay in VLD 53 plus a two-byte delay in HRA 52. Their relative phase is adjusted during the synchronization procedure.

The Received Byte Time Signals of RCC 51 control operations in RCC 51, AFD 54 and in half of HRA 52, namely Hold Register 0. The Local Byte Time Signals control operations in INT 55, VLD 53 and other half of HRA 52, namely Hold Register 1. The delay is preselected during initialization and stored as Delay Pointer in AFD 54.

A check is made in RCC 51 whether sync characters arrive correctly at mod. 21 intervals, to cause resynchronization if necessary.

5.3 Details of RCC 51 and HRA 52

Figure 6B:
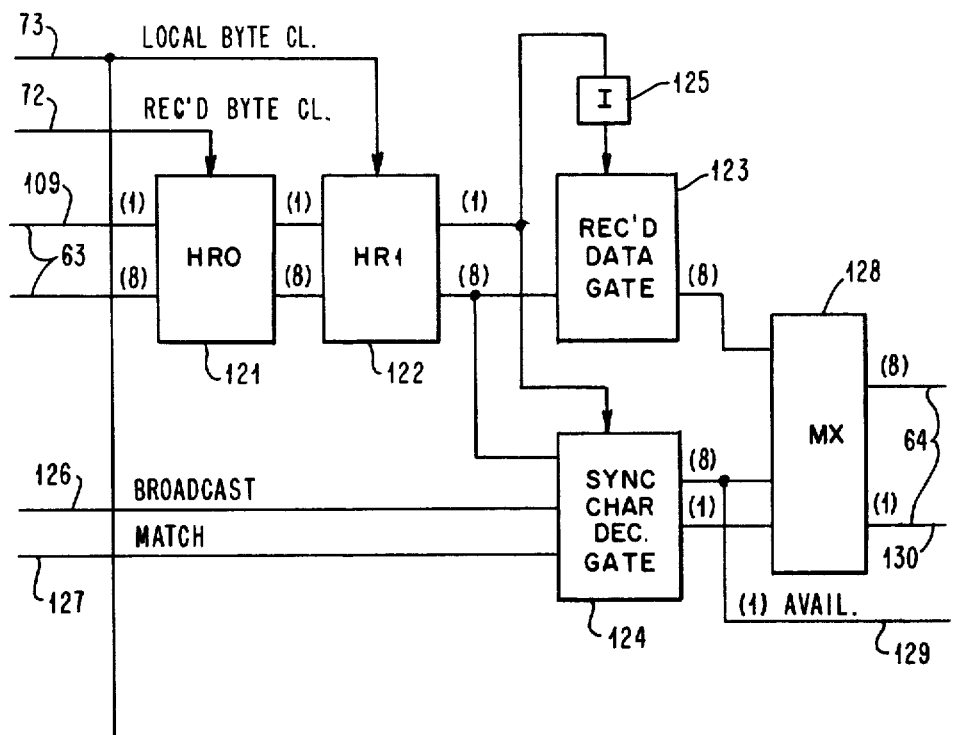
Figure 6B:
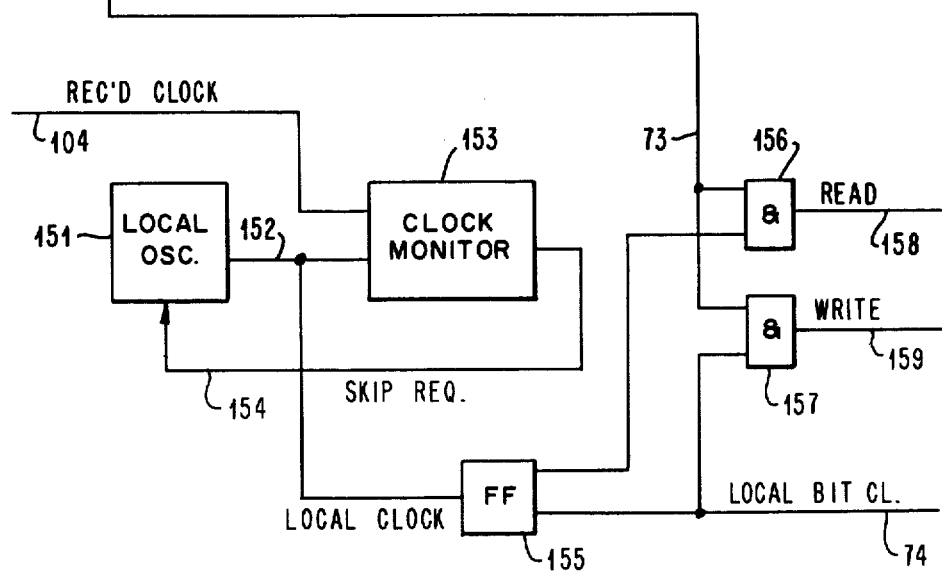

FIGS. 6A and 6B show details of Receiver, Control and Clocking Circuitry RCC 51 and of Hold Register Array HRA 52.

Connected to ring line 1 are receive clock derive means 101, code violation recognition means 102 and data bit recognition means 103. Receive clock derive means 101 furnishes on line 104 a Receive Clock Signal which has a frequency that is twice the data bit frequency. Flipflop 105 divides this clock signal by two and furnishes a Received Bit Clock Signal on line 106.

Code violation recognition means 102 detects when a signal pattern as shown in FIG. 3C which violates the normal coding pattern is received. Its output is delayed about one byte period by delay unit 107 which furnishes a signal "sync character detected". Latch 108 is set each time this signal occurs, and reset by the next byte clock pulse (line 72) so that a signal "S" is available for one byte period on line 109, with a delay of one byte period after occurence of a sync character.

Received Byte Timing Unit 110 is provided for generating several timing and count signals. It is started by each "sync character detected" pulse from delay element 107 which is gated by AND gate 111 to Reset input 112 when the OUT-Sync Signal on line 278 is up (furnished by INT 55), and it is advanced by pulses of the Received Bit Clock on line 106. Received Byte Timing Unit 110 has following output signals:

Lines 114: Received Bit Count Mod. 8 (3 parallel Bits)
Line 72: Received Byte Clock (1 pulse every eighth bit time)
Lines 116: Received Byte Count Mod. 21 (5 parallel Bits)
RBT 0/21: Received Byte Time 0=Sync Characters
RBT 1: Received Byte Time 1=Destination Address
RBT 2: Received Byte Time 2=Origin Address
RBT 3 ... 19: Received Byte Times 3 through 19=Control Character and Information Field (17 consecutive byte periods)
RBT 20: Received Byte Time 20=CRT Character These signals control the timing of various other units in the modem.

Data bit recognition means 103 converts the received sequence of polarity changes into a sequence of zero and one bits on line 117. Deserializer 118, under control of Received Bit Count Signals (114), accumulates in a register eight consecutive data bits into one byte which is available on data lines 63 for transfer to Hold Register Array 52. Data lines 63 include eight bit lines from Deserializer 118 plus the single bit line 109 which is up whenever a sync character was received.

HRA 52 (FIG. 6B) comprises two 9-bit registers HR0 121 and HR1 122, which are interconnected by nine parallel bit lines. HR0 is loaded by each pulse of the Received Byte Clock on line 72 with a data byte from deserializer 118 plus the S-Bit from latch 108. Contents of HR0 is transferred to HR1 by each pulse of a Local Byte Clock on line 73 which is generated in RCC 51 as will be described below.

HRA 52 further comprises a received data gate 123 and a sync decoder gate 124 for gating received information from HR1 to VLD 53. Received data gate 123 is connected to the eight data bit positions of HR1 and via an inverter 125 to the S bit position. It gates the data bits to its eight output lines whenever the S bit is zero (no sync character).

Sync decoder gate 124 is provided for converting the information received in a sync character, to a sync byte which is to be stored in VLD 53. The sync byte stored in VLD has a format as described already in section 5.2 above (sync character handling).

While information for bits PDA, POA, A and S is contained in HR1 as derived from the received sync character, pulses for bits B Broadcast and M Match are received on lines 126 and 127, respectively, from AFD 54. Sync decoder gate 124 is only active to furnish a sync byte on its 8+1 output lines when the S bit from HR1 is one, i.e. when HR1 contains sync character information.

A multiplexer unit 128 combines the outputs of gates 123 and 124 into the nine data lines 64 which form the input to VLD 53 (one of these lines, referenced as 130, carries the sync byte indicator bit). One of the output lines of sync decoder gate 124, i.e. the one which transfers the availability bit, is also connected to a line 129 for transferring this control signal to AFD 54 and to INT 55.

A group of two AND gates 131 and 133, and an inverter 135 (FIG. 6A) are interconnected as shown for checking the correct Mod. 21 arrival of sync characters. When the S indicator bit on line 109 is up simultaneously with a pulse on line RBT 0/21, a pulse "SYNC TIME OK" is furnished on line 137. If, however, the S indicator bit is up when no RBT 0/21 pulse occurs, a pulse "SYNC TIME ERROR" is generated on line 138.

RCC 51 comprises also means for generating a Local Clock Signal and adapting it to the Received Clock Signal, as shown in FIG. 6B. A local oscillator 151 generates clock pulses at a given frequency which are available on line 152. It is assumed that the local oscillator never has a lower pulse rate than the Received Clock (skipping of pulses can only decrease the bit rate along the loop). It is the purpose of clock monitor means 153 to prevent the Local Clock from ever being ahead of the Received Clock for more than one-quarter-byte period which is equivalent to two bit periods or four oscillator clock pulses. Clock monitor means 153 comprises counters for Local Clock pulses on line 152 and Received Clock pulses on line 104, and a skip detector that issues a skip request pulse on line 154 whenever the difference of the counter contents becomes four. This skip request pulse is transferred to local oscillator 151 which than will skip one pulse on output line 152. A bistable circuit (flipflop) 155 divides the Local Clock frequency by two and furnishes the Local Bit Clock on line 74. The two complementary outputs of flipflop 155 are also used to define read and write half cycles. Two AND gates 156 and 157 are connected to these two complementary outputs, and have each a second input connected to line 73 for receiving the Local Byte Clock from INT 55 (byte clock pulses lasting one complete bit period). Output lines 158 and 159 thus furnish once during each byte period a byte read pulse and a byte write pulse respectively.

5.4 Details of AFD 54

Figure 7A:
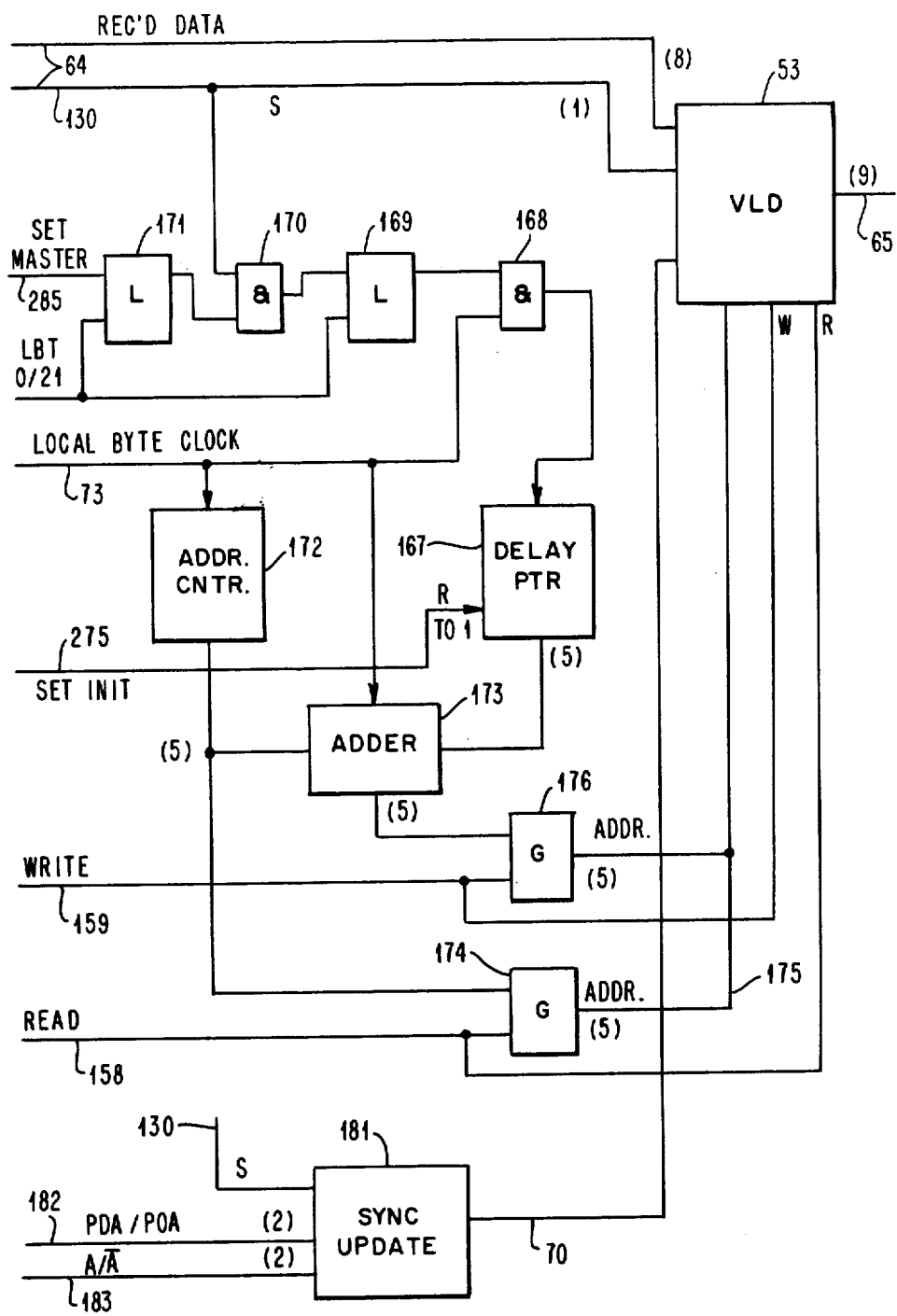
FIGS. 7A, 7B, and 7C Detailed block diagram of the addressing and frame disposition unit in the modem.
Figure 7B:
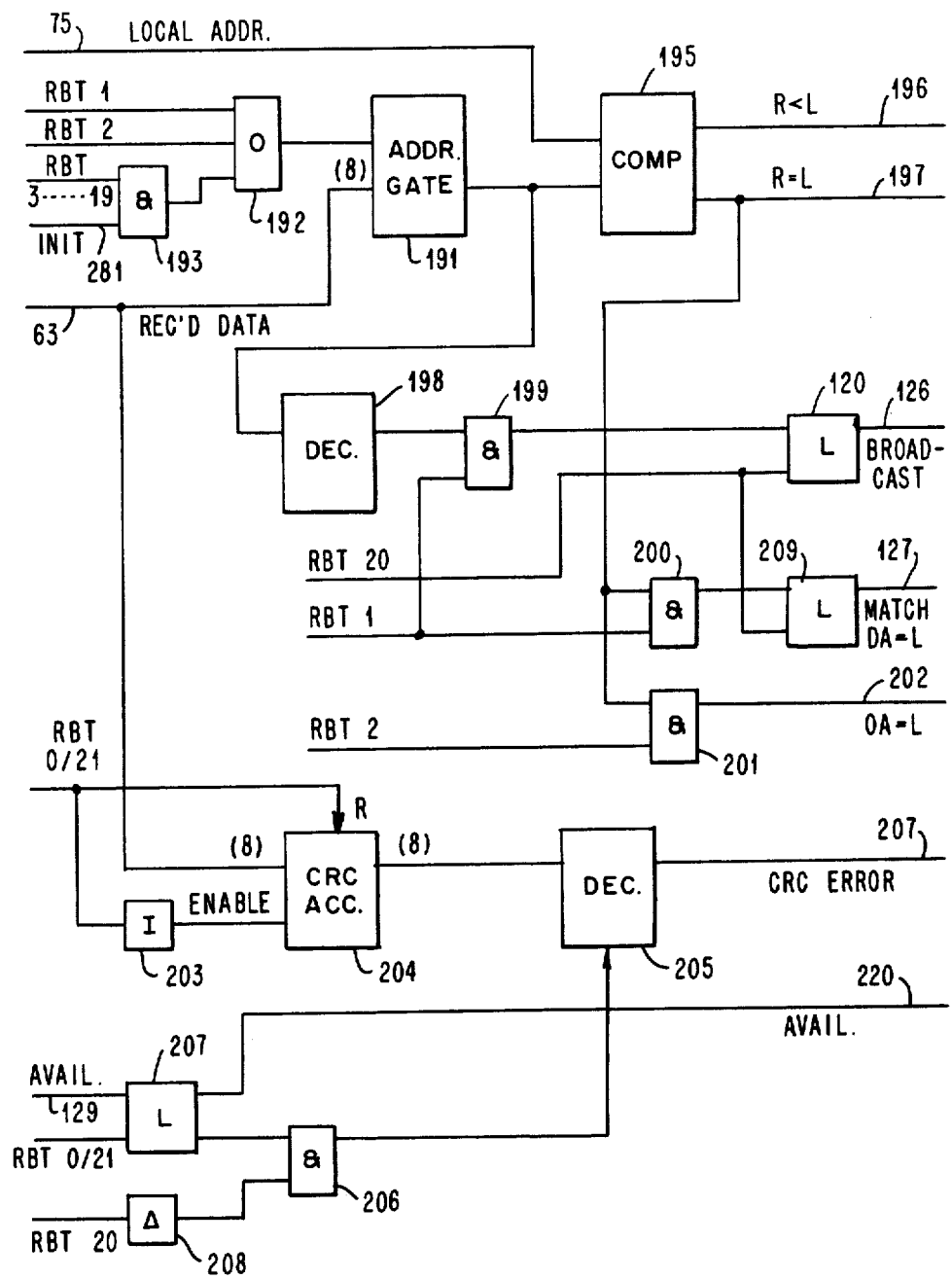
Figure 7C:
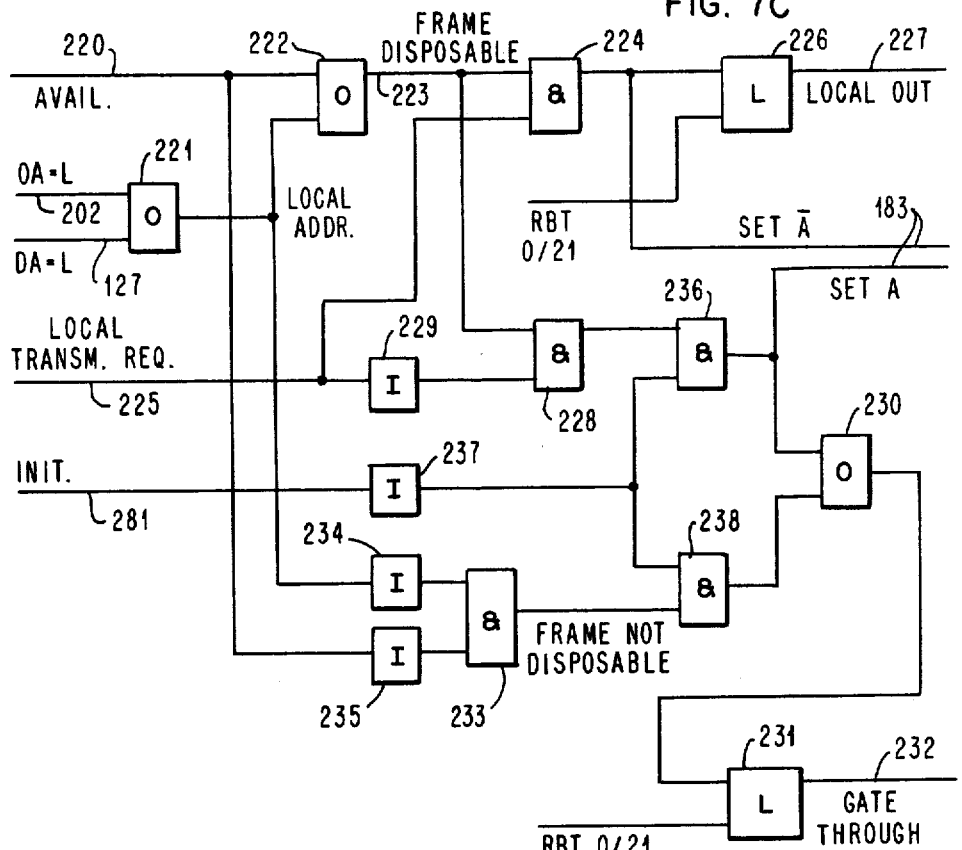

FIGS. 7A, 7B and 7C show details of Addressing and Frame Disposition Circuitry AFD 54 in connection with the Variable Length Delay Storage VLD 53. VLD 53 is just a buffer store comprising 32 addressable byte storage locations. Addresses and read/write control signals are provided by AFD 54.

A delay pointer unit 167 is provided for setting the variable delay in the station for frame synchronizing. Unit 167 is a counter which is reset to 1 when a SET INIT pulse appears on line 275 from INT 55. Delay pointer unit 167 is advanced by Local Byte Clock pulses (line 73) when AND gate 168 is opened. AND gate 168 is controlled by the output of a latch 169 which is set by an output pulse from AND gate 170. Inputs of AND gate 170 are connected to line 130 (S) which is active when a sync byte is transferred to VLD 53, and to the output of another latch 171. Set input of latch 171 is connected to a line 285 (SET MASTER Signal). Reset inputs of latches 168 and 171 are connected to byte timing line LBT 0/21 from INT 55.

The addressing circuitry consists mainly of a mod. 32 address counter 172, the delay pointer unit 167 and a mod. 32 adder 173. Address counter 172 is continuously advanced by Local Byte Clock pulses provided on line 73. Adder 173 receives the address of counter 172 and the delay pointer of unit 167 and furnishes at its output their sum (i.e. output = address count + delay pointer) but the result is given modulo 32, i.e. five bits only.

Gate 174 forwards the address count from counter 172 to addressing lines 175 of VLD 53 whenever a READ pulse appears on line 158. Gate 176 forwards the output of adder 173 to VLD addressing lines 175 whenever a WRITE pulse appears on line 159. Thus, when e.g. in a given byte period address counter 172 contains a 9 and delay pointer unit 167 contains a 7, writing will occur at location 16, and reading at location 9 of VLD 53. Seven byte periods later, when counter 172 contains a 16, writing will occur at location 23 but reading at location 16.

When a sync byte appearing on data lines 64 is written into VLD 53, an S pulse will appear on the ninth bit line (line 130) and will condition sync update circuitry 181 to correctly forward DA and OA parity sync update information present on lines 182 or frame disposition sync update information appearing on lines 183, to VLD 53, for updating the sync byte which is being written into VLD 53.

The frame disposition circuitry shown in FIGS. 7B and 7C evaluates addresses contained in received frames, does CRC checking, and combines the received availability bit, the result of address evaluation, and the local transmit request signal from the Link Manager to obtain control signals for gating through received frames or gating out local data from the Link Manager.

An address gate 191 (FIG. 7B) is connected by eight data lines 63 to the output of RCC 51. The gate is controlled by an output signal of OR gate 192 which receives as inputs Received Byte Time Signals RBT 1, RBT 2 and from AND gate 193 the combination of RBT 3 ... 19 and initialization indication signal INIT on line 281. Thus, address gate 191 is opened always during byte times 1 and 2 (i.e. destination address and origin address), but is opened during byte times 3 ... 19 (i.e. control character and information field) only during the loop initialization period.

AFD 54 obtains Received Byte Time Signals RBT 1, RBT 2, RBT 3 ... 19, RBT 20 and RBT 0/21 from RCC 51 where they are developed as described earlier.

Received bytes gated by address gate 191 are furnished to comparator 195 which receives also on line 75 the local station address from local address generator 57. A pulse is furnished on line 196 when the received byte or address is less than the local address (R<L), and on line 197 when the received byte or address is equal to the local address (R=L).

The output of address gate 191 is also furnished to decoder 198 which passes an output pulse to AND gate 199 when the received byte or address is equal to a predetermined broadcast address (addressing all stations in the system). If the broadcast address appeared during RBT 1 (destination address), AND gate 199 will forward the pulse to the SET input of latch 120, which will then activate the signal BROADCAST on line 126 to HRA 52.

The pulse on line 197 (R=L) will be passed on by AND gate 200 if it occurred during RBT 1 (i.e., destination address = local address) for setting latch 209 and thus activating signal line 127, or it will be passed on by AND gate 201 to line 202 if it occured during RBT 2 (i.e., origin address = local address).

A CRC accumulator 204 is also connected to data lines 63. It is reset by RBT 0/21, but is enabled by the output of inverter 203 which is active during byte times RBT 1 ... RBT 20. Thus, CRC accumulator 204 accumulates all bytes of a frame except the sync byte, and should contain a known bit pattern (e.g. all zeros) at RBT 0/21 (sync character time).

The bit pattern in CRC accumulator 204 is tested by decoder 205 when it receives an activating signal from AND gate 206 at the end of an unavailable frame. If the known bit pattern is not present when testing is made, a CRC error signal is issued over line 207 to the Link Manager and to Inbound/Outbound Interface 55. AND gate 206 receives input signals from the complement output of a latch 207 which is set by an AVAILABLE signal pulse on line 129 and reset by RBT 0/21, and from timing line RBT 20 as delayed by a delay element 208.

An OR gate 221 (FIG. 7C) is connected to lines 127 (DA=Local) and 202 (OA=Local). Its output is connected to one input of OR gate 222, the other input of which is connected by line 220 to the true output of latch 207. Thus, on line 223 there appears a pulse "frame disposable" whenever either the destination address or the origin address of the present frame was equal to the local address, or when availability was indicated in the sync character of the respective frame. AND gate 224 receives the output of OR gate 222 and a local transmit request signal on line 225 from the Link Manager, to generate an output pulse when the frame is disposable for that station and must be seized. This pulse will set Latch 226 which then furnishes a LOCAL OUT signal which is transferred on line 227 to INT 55 for gating a local frame out.

AND gate 228 also receives the output of OR gate 222 but through inverter 229 the inverse of the local transmit signal. It generates an output pulse when the frame is disposable for that station but will not be seized. This pulse will set, through AND gate 236 (controlled via inverter 237 by the INIT signal on line 281) and through OR gate 230, latch 231 which then furnishes a GATE THROUGH signal which is transferred on line 232 to INT 55 for controlling the forwarding of the received frame.

AND gate 233 has one input connected through inverter 234 to the output of OR gate 221, and another input through inverter 235 and line 220 to the true output of latch 207. Thus, it will furnish an output pulse when a frame is marked unavailable and does not contain the local address as destination address or origin address, i.e. when the respective frame is not disposable. This pulse is also forwarded through AND gate 238, if conditioned by the output of inverter 237 (when the INIT signal on line 281 is inactive), and through OR gate 230 to latch 231 for setting it.

Both Latches 226 and 231 are reset at the beginning of each frame, i.e. by RBT 0/21.

Output signal of AND gate 224 is also sent as pulse A (reset available), and output signal of AND gate 236 is also sent as pulse A (set available) to inputs of sync update circuitry 181 on line pair 183, to cause updating of the availability bit in the sync byte stored in VLD 53.

5.5 Details of INT 55 and TED 56

FIGS. 8A, 8B, 8C and 8D show details of Inbound-/Outbound Interface Circuitry INT 55 in connection with the Transmitting Encoder and Driver Circuitry TED 56.

Figure 8A:
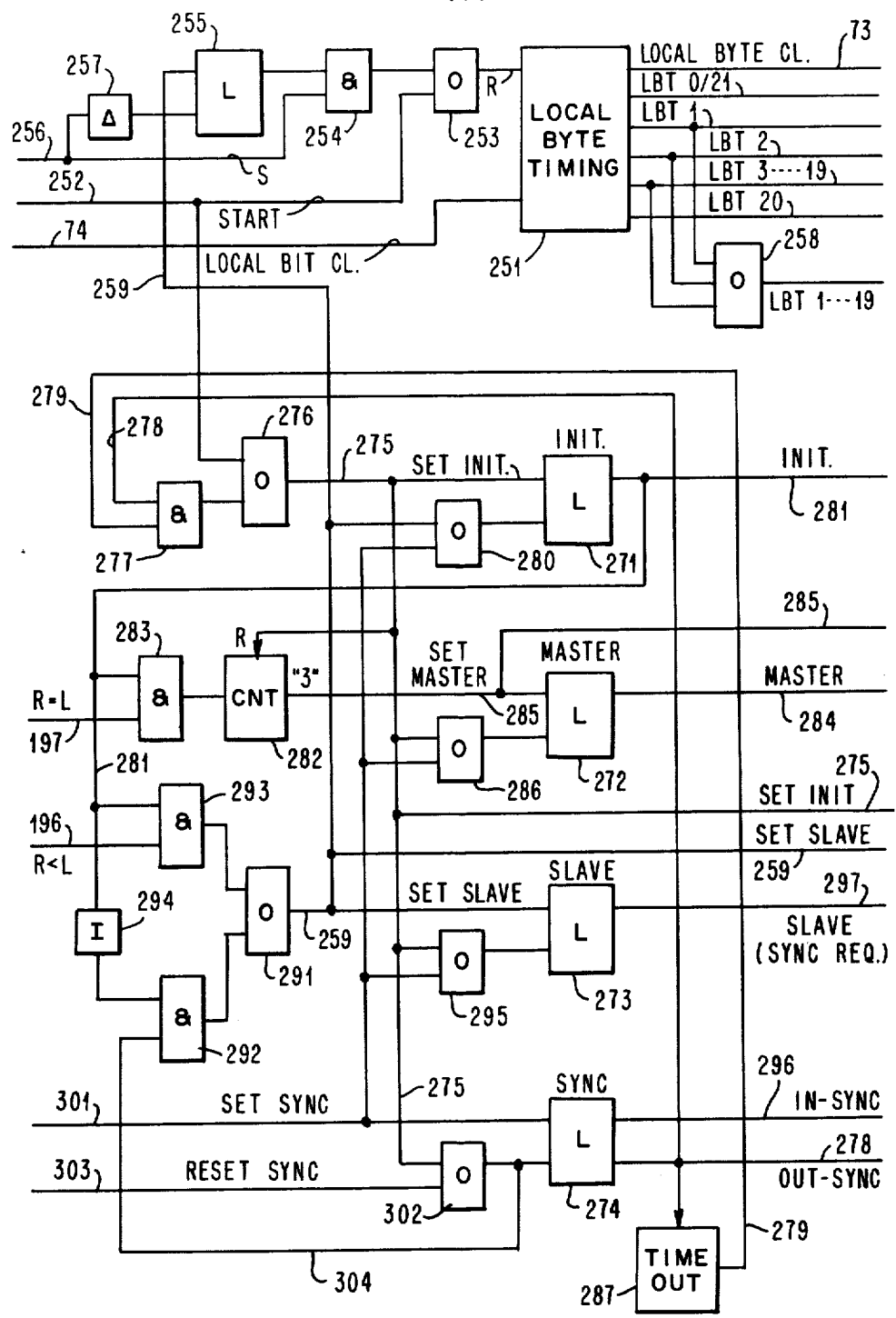
FIGS. 8A, 8B, 8C and 8D Detailed block diagram of the inbound/outbound interface circuitry in the modem.

In FIG. 8A, Local Byte Timing Unit 251 is controlled by the Local Bit Clock received on line 74 from RCC 51, and furnishes Local Byte Time Signals LBT 0/21, LBT 1, LBT 2, LBT 3 . . . 19 and LBT 20 for distinguishing within each frame period the intervals for the sync byte (0/21), destination address (1), origin address (2), control byte and information field (3 . . . 19) and CRC character (20). A Local Byte Clock is furnished on output line 73. A combined timing signal LBT 1 . . . 19 is furnished by OR gate 258.

Local Byte Timing Unit 251 is reset or started either initially by a START signal on line 252, forwarded by OR gate 253, or when a resynchronization pulse appears at the output of AND gate 254.

After starting, Local Byte Timing Unit 251 is not synchronized to a received data stream, but can control local generation of a data stream comprising regularly spaced sync characters. Local Byte Timing Unit is reset for synchronizing it to a received data stream under two conditions:

(a) When an address less than the local address is received during initialization phase.

(b) When the modem is not in initialization phase but is out of sync.

Each next reading of a sync byte out of VLD 53 under these conditions must restart Local Byte Timing Unit 251 by restart pulse from AND gate 254.

AND gate 254 is conditioned by the output of latch 255 which is set when a signal SET SLAVE (indicating above two conditions) is active on line 259, and it generates a resync pulse when an S pulse appears on output line 256 indicating the presence of a sync byte. This S pulse, delayed by delay element 257, will also reset latch 255. Generation of the control signals on lines 256 and 259 is explained further below.

Local Byte Timing Signals LBT have the same rate and duration as corresponding Received Byte Timing Signals RBT (which are generated in RCC 51), but they have a phase shift which corresponds to the delay introduced by VLD 53, plus two byte period delays due to shifting through the two registers of HRA 52.

Four latches are provided for distinguishing different modes or states of the modem during loop initialization and synchronization and for generating necessary control signals: Initialize Latch 271 INIT, Temporary Master Latch 272 MASTER, Temporary Slave Latch 273 SLAVE, and Sync Status Latch 274 SYNC. They are controlled as follows:

INIT Latch 271 is set by a pulse on line 275 from OR gate 276 either when a START pulse appears on line 252, or when the output of AND gate 277 indicates simultaneous presence of OUTSYNC condition on output line 278 of SYNC Latch 274 and a timeout pulse from a time-out unit 287 on line 279. Latch 271 is reset by a signal SET SLAVE on line 259 or a signal SET SYNC on line 301 via OR gate 280. The output signal INIT available on line 281 indicates that the modem is in an initialization phase.

MASTER Latch 272 is set by a pulse on line 285 when a modulo 4 counter 282 reaches count value 3. The counter is reset by a SET INIT pulse on line 275, and receives advance pulses from AND gate 283 which is conditioned by an active INIT Signal on line 281 to forward each pulse "R=L" (own address received) appearing on line 197 from AFD 54. Latch 272 is reset by a SET INIT pulse on line 275 or by a SET SYNC pulse on line 301 via OR gate 286. It furnishes on its output line 284 a MASTER signal which indicates that the respective modem was selected as temporary master controlling loop synchronization.

SLAVE Latch 273 is set when OR gate 291 receives a pulse from either AND gate 292 or AND gate 293. AND gate 292 is connected to the reset line 304 of latch 274, and via inverter 294 to the INIT output line 281 of latch 271. AND gate 293 is connected to the "R<L" signal line 196 from AFD 54, and to the INIT output line of latch 271. The signal SET SLAVE on line 259 indicates that resynchronization is required, and is also furnished to the input of latch 255 (see above). SLAVE Latch 273 is reset via OR gate 295 either by a SET INIT pulse on line 275 or by the SET SYNC signal on line 301. The SLAVE/SYNC REQ Signal on output line 297 of latch 273 indicates that the respective modem is in initialization status but was not selected as temporary master, or that it is temporarily out of sync after the initialization phase.

Figure 8B:
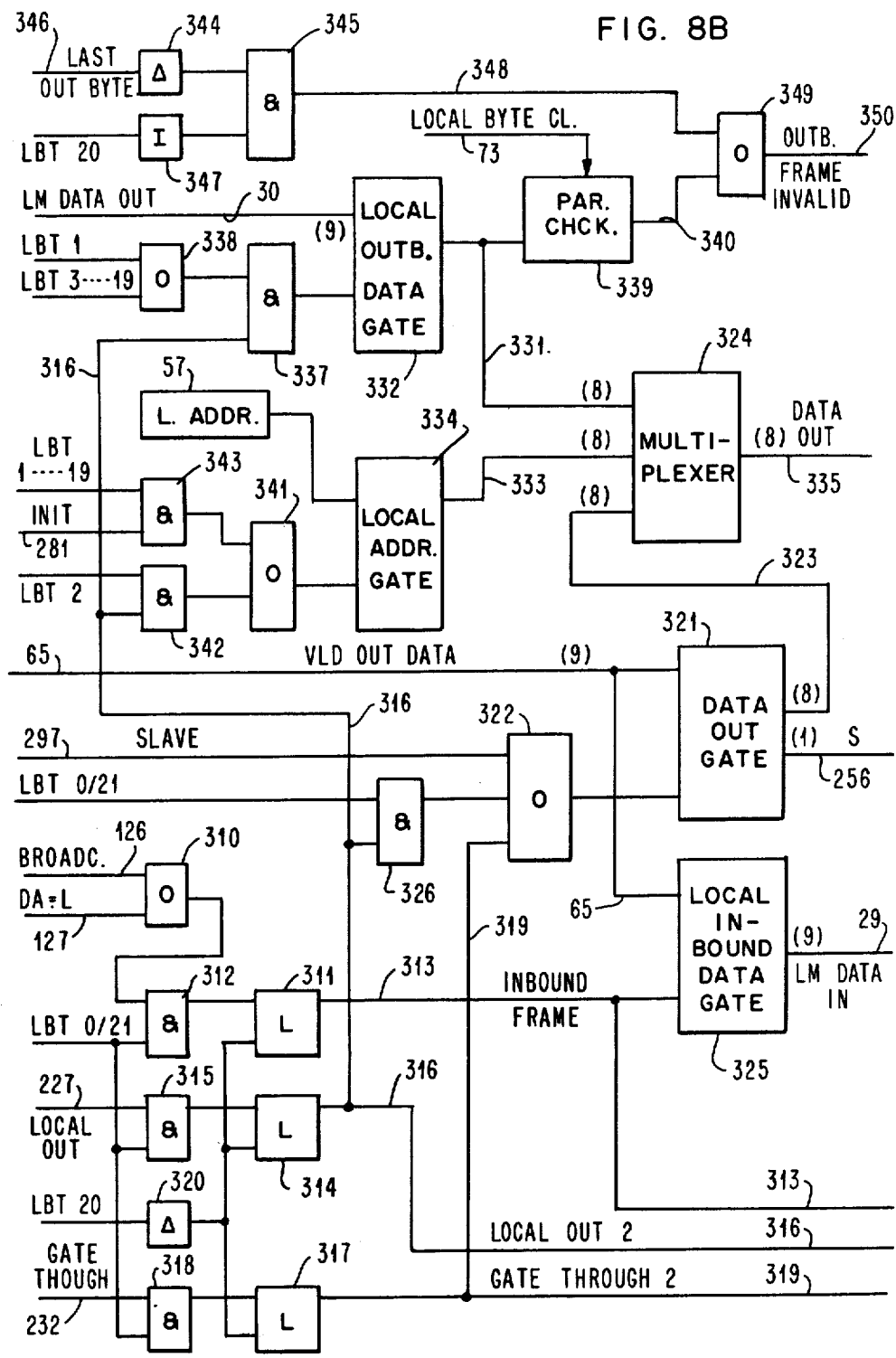
Figure 8C:
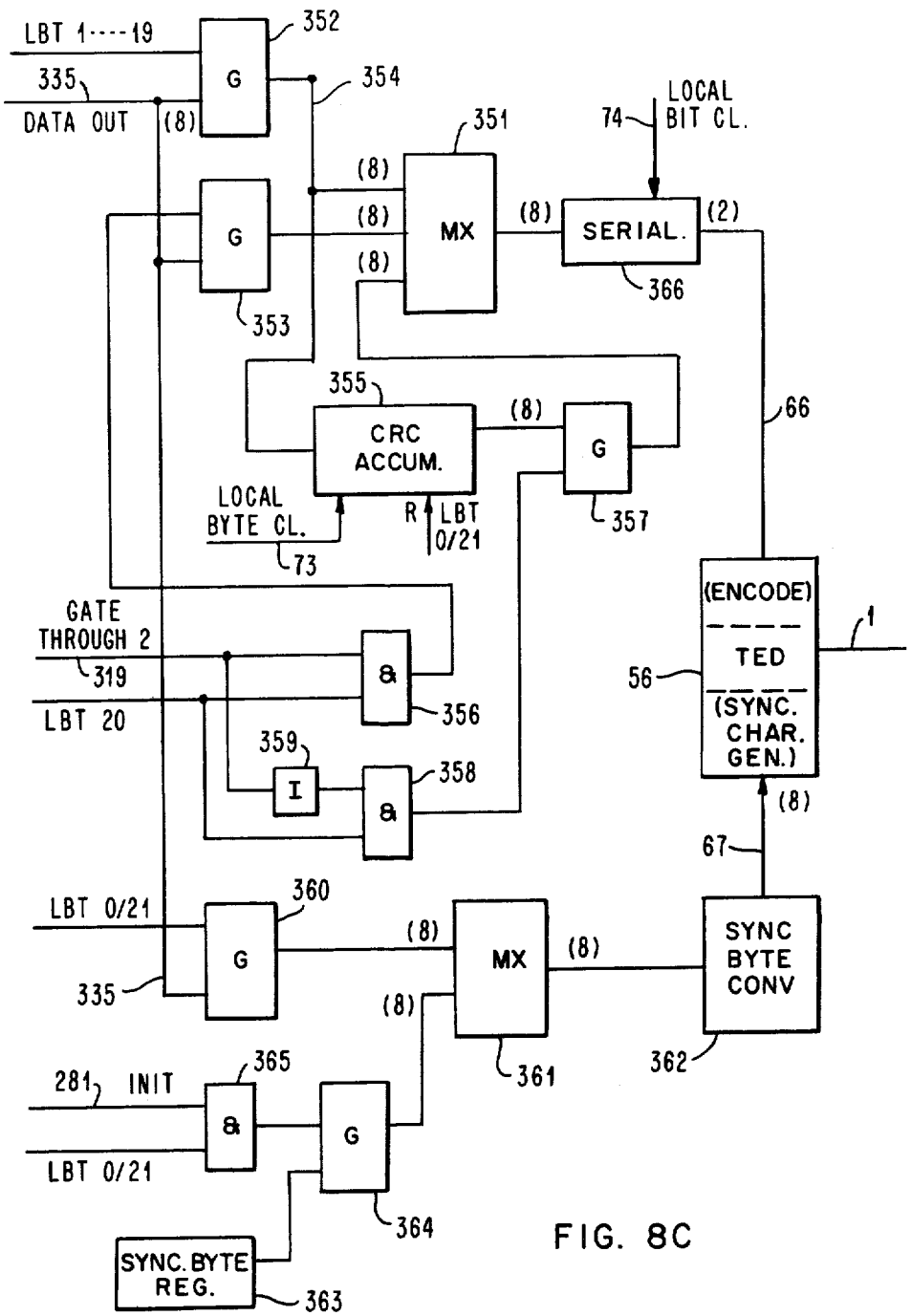
Figure 8D:
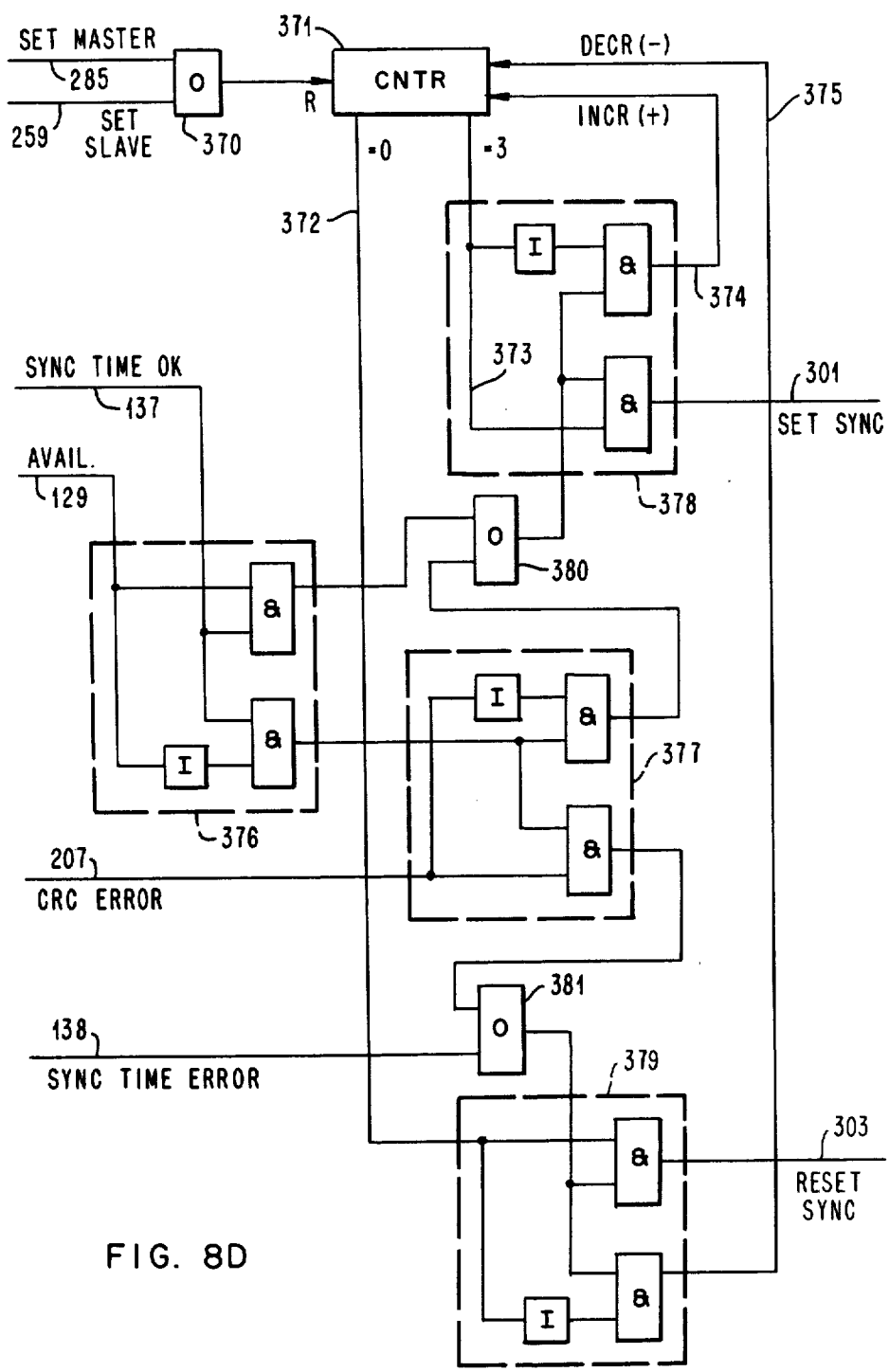

SYNC Latch 274 is set when it receives a SET SYNC pulse from line 301 which originates in the synchronization circuitry shown in FIG. 8D. Latch 274 is reset via line 304 and OR gate 302 by a SET INIT pulse on line 275 or by a RESET SYNC Signal on line 303 originating in the synchronization circuitry shown in FIG. 8D. The true output signal IN-SYNC of latch 274 is available on line 296, and the complimentary output signal OUT-SYNC is available on line 278.

A time-out unit 287 is started whenever the OUT-SYNC Signal is raised. This unit furnishes after a preselected time period a signal TIME OUT on its output line 279 by which an initialization process can be started when the out of sync status (and the resync efforts) last too long.

FIGS. 8B and 8C show the outbound frame transmission part of INT 55. Three latches are provided for adapting the timing of control signals generated in connection with Received Byte Timing in AFD 54, to Local Byte Timing which governs the transmission part in INT 55.

Latch 311 is set by an output pulse of AND gate 312 which receives a SET signal from OR gate 310 and Timing Signal LBT 0/21. Inputs of OR gate 310 are connected to signals lines 126 (BROADCAST) and 127 (DA=LOCAL). Latch 311 furnishes an output signal INBOUND FRAME on line 313 for gating bytes 0 ... 20 of a frame addressed to the respective station.

Latch 314 is set by an output pulse of AND gate 315 which receives control signal LOCAL OUT on line 227 from AFD 54 and timing signal LBT 0/21. It furnishes an output signal LOCAL OUT 2 on line 316 for gating bytes 0 ... 20 of a frame to be transmitted from the respective station.

Latch 317 is set by an output pulse of AND gate 318 which receives control signal GATE THROUGH on line 232 from AFD 54 and timing signal LBT 0/21. It furnishes an output signal GATE THROUGH 2 on line 319 for gating a complete frame from receiver to transmitter through the modem.

All three latches 311, 314, and 317 are reset by timing signal LBT 20, delayed by a delay element 320, just before the start of timing signal LBT 0/21.

Two byte-wide gates are provided which both are connected to output lines 65 of VLD 53. Data Out Gate 321 is controlled by the output of OR gate 322 which receives control signals GATE THROUGH 2 on line 319, SLAVE on line 297, and LOCAL OUT 2 (line 316) through AND gate 326 during byte time LBT 0/21 (sync byte). Data Out Gate 321 when activated gates signals from lines 65 to lines 323 which are connected to one group of inputs of multiplexer 324 which combines input signals from three sources.

Local Inbound Data Gate 325 is controlled by the INBOUND FRAME Signal on line 313. When activated, it transfers signals from lines 65 to lines 29 which are the data input lines of Link Manager 21.

Gate 321 has an additional separate output line 256 (mentioned above already) for the ninth bit or S bit which line is activated when a sync byte is transferred by the Data Out Gate. The pulse on line 256 is transferred to the Local Byte Timing Circuitry (FIG. 8A) for adapting it to the delayed data stream.

Line 313 is connected also to Link Manager 21 to transfer a START INBOUND FRAME Signal when the gating of a frame by gate 325 begins. Line 316 is connected also to Link Manager 21 to transfer a START OUTBOUND FRAME Signal when the control signal LOCAL OUT 2 for local outbound frames begins.

Outbound Data Assembling Circuitry:

Multiplexer 324 assembles data on lines 323 from Data Out Gate 321, on lines 331 from Local Outbound Data Gate 332 and on lines 333 from Local Address Gate 334 into a single byte stream on eight lines 335.

Local Outbound Data Gate 332 has its data inputs connected to the nine parallel Link Manager data output lines 30. Its control input is connected to AND gate 337 which receives at its inputs the LOCAL OUT 2 control signal on line 316 and from OR gate 338 the combination of time signals LBT 1 and LBT 3 ... 19.

Output lines of gate 332 are also connected to the input of a parity check unit 339 which is timed by Local Byte Clock on line 73, and generates a PARITY ERROR pulse on its output line 340 if the parity bit does not match the data bits.

Local Address Gate 334 has its data inputs connected to the local address selector 57 over lines 75. Its control input is connected to OR gate 341 whose inputs are connected to outputs of AND gates 342 and 343. And gate 342 inputs are connected to LOCAL OUT 2 line 316 and timing signal line LBT 2. AND gate 343 inputs are connected to INIT line 281 and to timing signal line LBT 1 ... 19 (output of OR gate 258).

An AND gate 345 receives, delayed by delay element 344 for one byte period, the LAST BYTE OUT Signal on line 346 from the Link Manager, and from inverter 347 the complement of timing signal LBT 20. The resulting signal on line 348 is combined with the signal on line 340 in OR gate 349 and the result is transferred to the Link Manager on line 350 as OUTBOUND FRAME INVALID Signal. This signal is active whenever during transfer of an outbound frame a parity error was detected, or when the Link Manager LAST BYTE OUT Signal does not occur during byte time 19 (last byte of information field).

Signals on lines 335 are transferred to multiplexer 351 (FIG. 8C) either by 8-bit gate 352 or by 8-bit gate 353. Gate 352 is opened by timing signal LBT ... 19 (output of OR gate 258). Its output signals on lines 354 are also transferred to CRC accumulator 355 which accumulates consecutive bytes to obtain a cyclic redundancy check CRC character. It is reset by signal LBT 0/21 at the beginning of each frame, and is advanced by the Local Byte Clock (line 73).

Gate 353 is opened by an active output signal of AND gate 356 which receives as inputs the GATE THROUGH 2 signal on line 319 and timing signal LBT 20.

An 8-bit gate 357 is opened to gate the contents of CRC accumulator 355 to multiplexer 351 when AND gate 358 has an active output signal. AND gate 358 has inputs from inverter 359 which is connected to GATE THROUGH 2 signal line 319, and timing signal line LBT 20. Thus, either a transferred CRC character from multiplexer 324 (through gate 353) or a locally generated CRC character from accumulator 355 is furnished to multiplexer 351.

Signals on lines 335 are also transferred by 8-bit gate 360 when this is opened by timing signal LBT 0/21 via a multiplexer 361 to sync byte converter 362. Permanent contents of a sync byte register 363 are transferred through gate 364 to sync byte converter 362 when an output control pulse is furnished by AND gate 365. Inputs to AND gate 365 are the INIT Signal on line 281 and the LBT 0/21 pulse. Sync byte register 363 furnishes permanently the information that is required for generating sync characters during an initialization phase. Sync byte converter 362 code converts the sync byte it receives as input into sync character information in an operation that is inverse to the operation of sync decoder gate 124, using the same code conversion table as that presented above in section 5.2. Output lines 67 of sync byte converter 362 are connected to a sync character generation part of TED 56 which generates a sync character signal including the necessary code violations and availability and address parity information.

The output of multiplexer 351, i.e., 8-bit bytes, is converted to consecutive 2-bit groups by serializer 366 which also receives the Local Bit Clock on line 74. These 2-bit groups are transferred on lines 66 to the normal signal encoder part of TED 56 which generates a sequence of polarity changes for transmission over link 1.

Synchronization and Flywheel Circuitry:

FIG. 8D shows circuitry within INT 55 which provides the synchronization and sync flywheel mechanism. A modulo 4 counter 371 is provided having a reset input that is connected through OR gate 370 to line 285 and to line 259 so that the counter is reset to zero when the SET MASTER Signal or the SET SLAVE Signal (SYNC REQ) comes up. Counter 371 has an output line 372 indicating contents=0, and an output line 373 indicating contents=3. It has further an incrementing input line 374 and a decrementing input line 375.

There are four testing circuits 376, 377, 378, 379 each comprising two AND gates and one inverter, and two OR gates 380 and 381, which are interconnected, and connected to signal lines 137 (SYNC TIME OK), 129 (AVAILABLE), 207 (CRC ERROR), 138 (SYNC TIME ERROR), 372 (COUNT=0) and 373 (COUNT=3) as shown in FIG. 8D. Depending on the signal status on the four input lines 137, 129, 207 and 138, and on the counter status, one of the four output lines 301, 303, 374 and 375 of testing circuits 378 and 379 will furnish a pulse, so that either contents of counter 371 will be incremented or decremented, a SET SYNC pulse will appear on line 301, or a RESET SYNC pulse will appear on line 303. The pulses on lines 301 and 303 will cause either setting or resetting of SYNC latch 274.

The following table shows which combination of states of the input signals and of counter contents will cause a pulse on each of the four lines 301, 303, 374 and 375.

| Condition for flywheel changes and for setting/resetting sync state | | | | | | |
|---|---|---|---|---|---|---|
| SYNC TIME OK | 1 | OR | 1 | — | OR | 1 |
| AVAILABLE FRAME | 1 | | 0 | — | | 0 |
| CRC ERROR | — | | 0 | — | | 1 |
| SYNC TIME ERROR | — | | — | 1 | | — |
| COUNTER CONTENTs | <3 | | =3 | >0 | | =0 |
| INCREASE | 1 | | 0 | 0 | | 0 |
| SET SYNC | 0 | | 1 | 0 | | 0 |
| DECREASE | 0 | | 0 | 1 | | 0 |
| RESET SYNC | 0 | | 0 | 0 | | 1 |

6. LOOP INITIALIZATION AND SYNCHRONIZATION

6.1 Basic Procedures

There are two situations in which synchronization is required:

(a) The modems of all stations are out of sync, i.e. the whole loop system is unsynchronized. This is the case e.g. when the system is switched on, or when a failure is persistent.

(b) A single modem is out of sync, while the loop system, i.e. all other station modems, still operate in synchronism.

Three procedures are provided for synchronization in the present system which embodies the invention, of which all three are required for situation (a), i.e. for loop initialization, whereas for situation (b), i.e. single modem synchronization, only the third procedure is required.

These procedures are:

(1) Temporary master selection
(2) Loop delay adjustment
(3) Modem synchronization (and resynchronization)

In the temporary master selection procedure, byte synchronization is achieved on the loop, and the modem of the station with the lowest address is selected as temporary master which then controls frame synchronization on the loop. In the loop delay adjustment procedure, the temporary master modem adjusts its internal delay in such a way that the total delay on the loop is an integer multiple of the basic frame duration. Finally, in the modem synchronization procedure, each modem which is already in byte synchronization (but is not in frame synchronization) synchronizes itself to the loop frame period determined by the temporary master.

Figure 9:
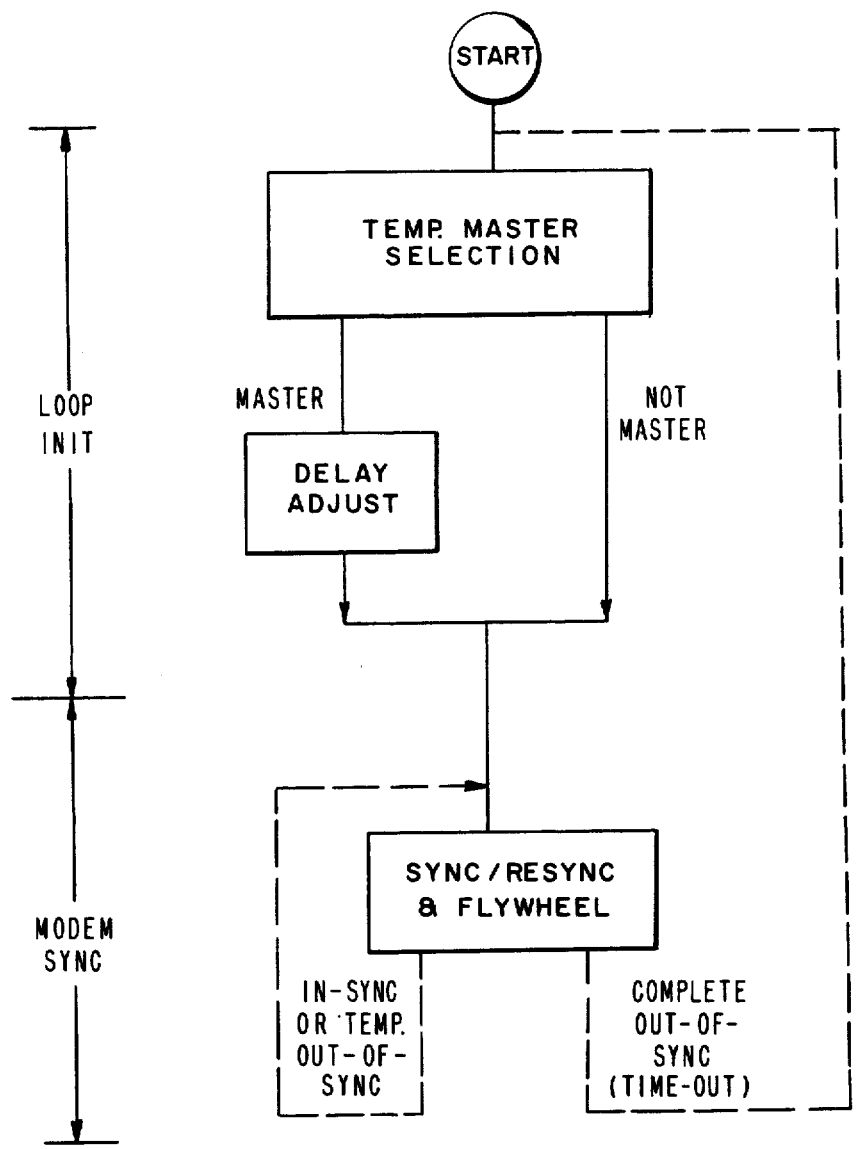
FIG. 9 Survey chart of loop initialization and synchronization procedures.

During normal operation, each modem continuously checks its sync condition using a flywheel-type mechanism, and when it detects to be out of sync it starts again the modem synchronization procedure. This sync checking is part of the third procedure. Interaction of the three procedures is illustrated in the schematic diagram of FIG. 9.

Details of the three procedures and operation of the respective functional units and circuitry is explained in more detail in the following:

(1) Temporary Master Selection

Figure 10:
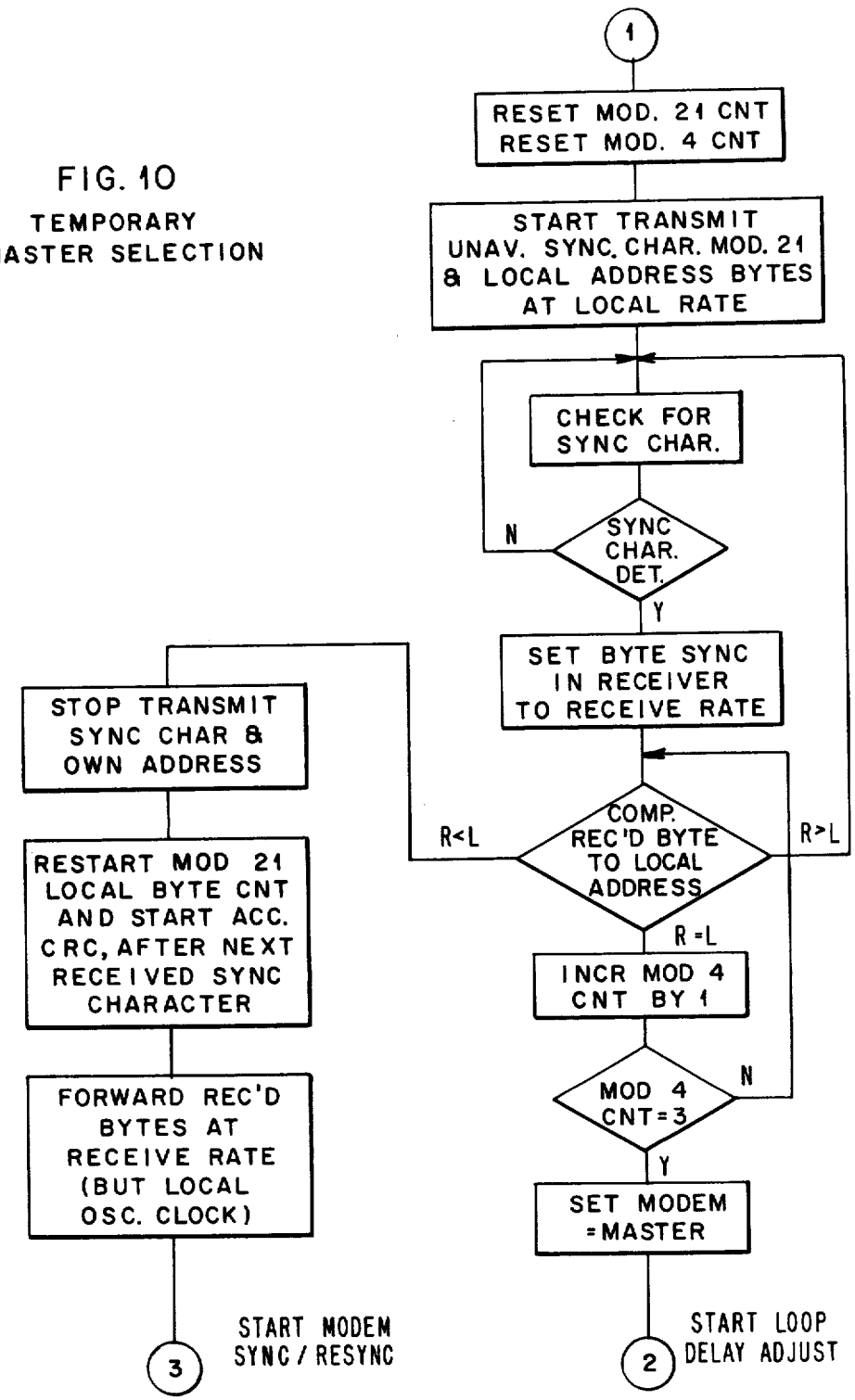
FIG. 10 Flow diagram of the temporary master selection procedure.

A flow diagram of the temporary master selection procedure is shown in FIG. 10. Each modem that detects the loop to be out of sync (unsuccessful modem synchronization efforts exceeding a given time-out period) resets its sync counters and transmits a sync character including the code violation, followed by its own address in all byte fields of consecutive frames at the local clock rate. It further looks for sync characters to arrive, and byte synchronizes its receiver section when it detects a sync character. It then compares subsequent received bytes as addresses to its own local address which results in either of three actions:

(a) When received address is less than local address: stop sending own address, reset local byte count (mod. 21) and start accumulating CRC characters and forward received bytes, i.e. a sync character followed by another station's lower address, and start modem sync procedure.

(b) When received address is greater than local address: continue transmitting local address in consecutive byte slots, with a sync character every 21st byte time, and continue looking for sync characters in received data and comparing address.

(c) When received address equals own address: advance a modulo 4 counter; if counter contents is 3: set respective modem to "temporary master" and start loop delay adjustment procedure.

(2) Loop Delay Adjust

The station modem that was selected to be the temporary master, because it received its own address, uses the loop delay adjust procedure to increase storage duration in its Variable Length Delay Storage VLD so that total loop propagation time is an integer multiple of the frame duration, i.e. a sync character must be received every 21st byte time.

Figure 11:
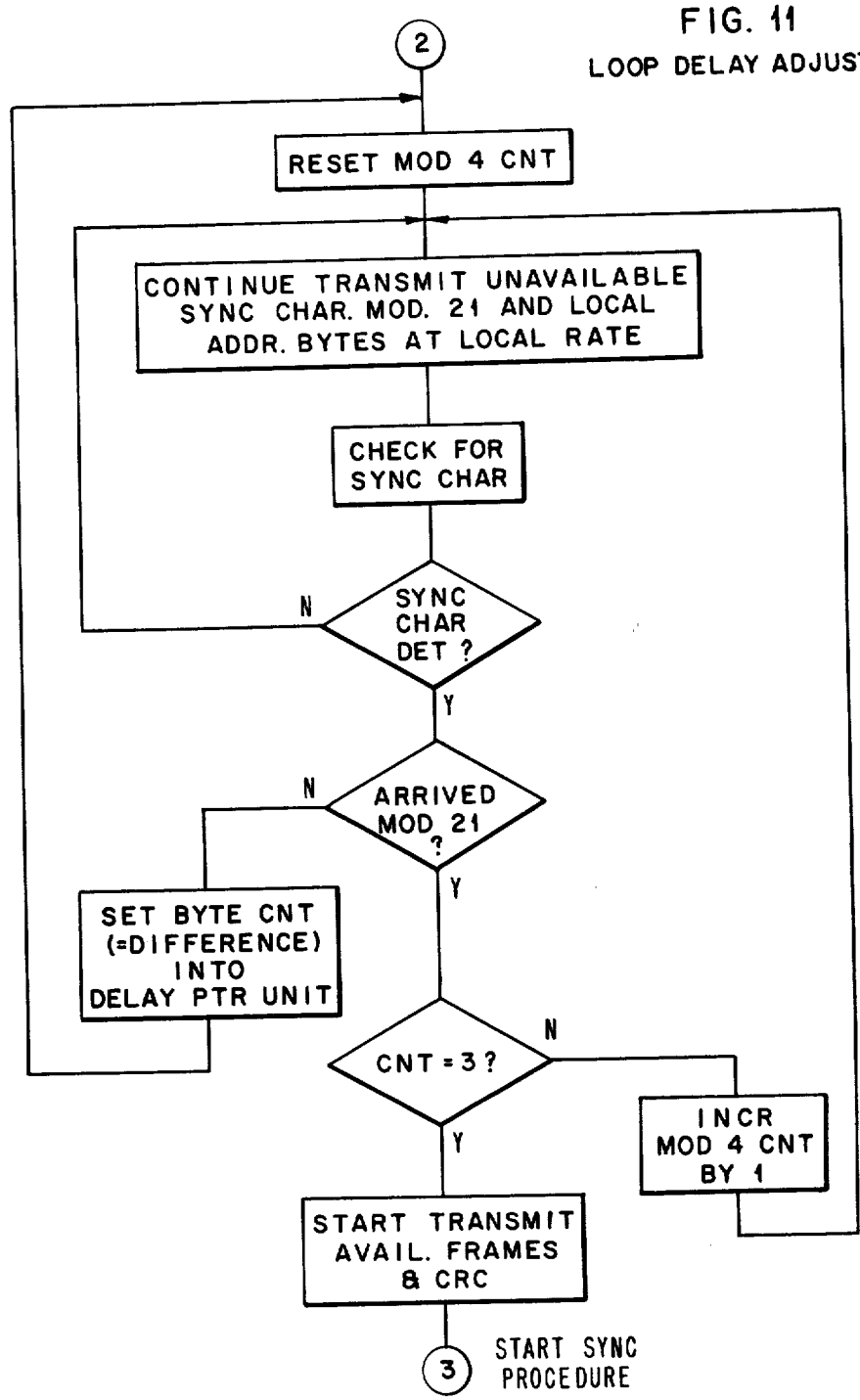
FIG. 11 Flow diagram of the loop delay adjustment procedure.

FIG. 11 is a flow diagram of this procedure. The temporary master continues to transmit sync characters marked unavailable at a modulo 21 rate, followed by bytes representing its own local address. It further looks for sync characters to arrive, and checks if any detected sync character arrived modulo 21. If this is not true, the difference between receive time and local transmit time of sync bytes is counted and stored as Delay Pointer in AFD 54 for increasing the delay in VLD 53 by the respective amount, and the checking is continued. If a sync character arrived at the correct modulo 21 timing three consecutive times, a "synchronized" indicator is set in the respective modem. The modem then starts transmitting frames marked available and including a valid CRC character. It then can start operating normally.

(3) Modem Sync/Resync

Figure 12:
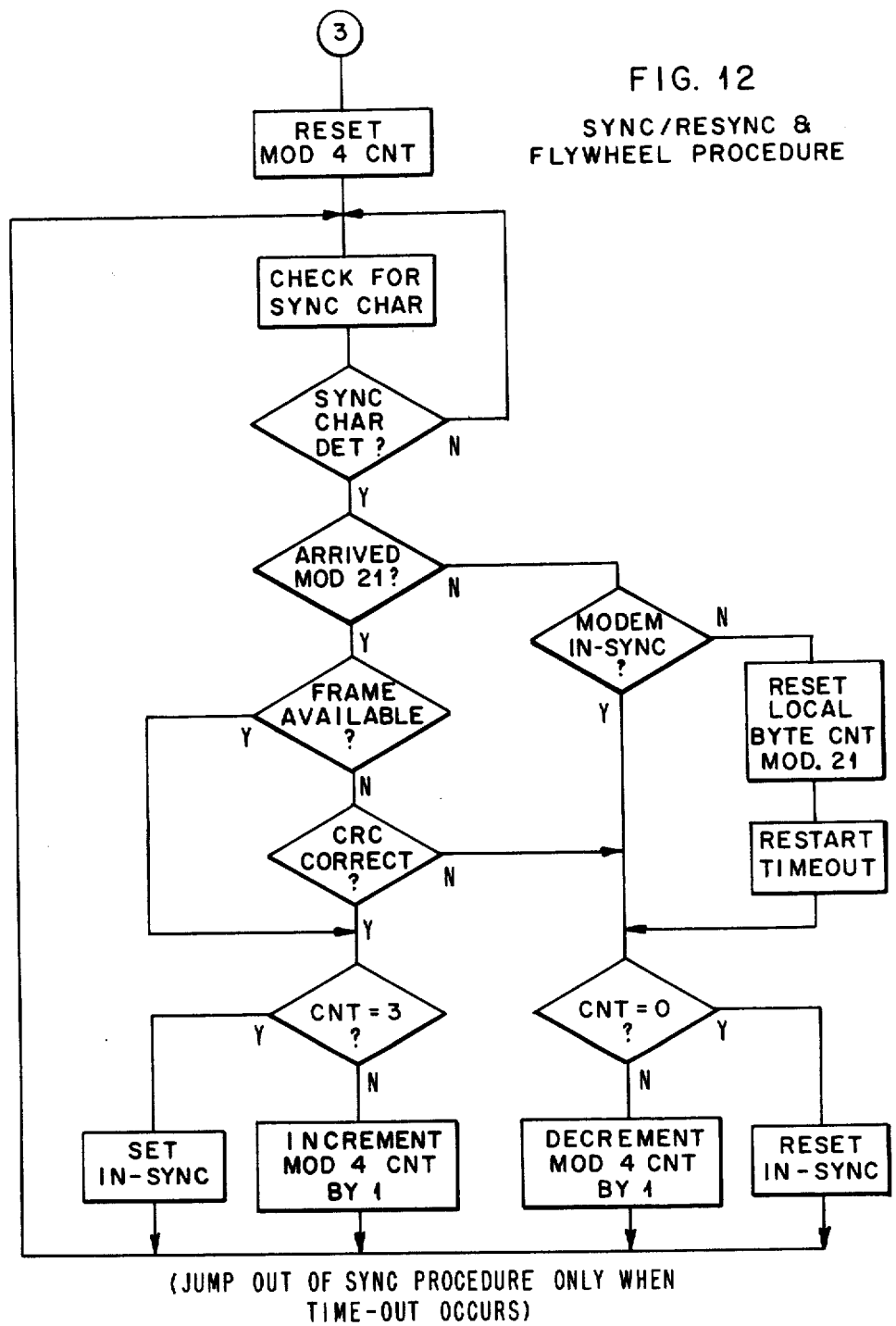
FIG. 12 Flow diagram of the synchronization/resynchronization and flywheel procedure.

The third procedure is used for initial synchronization of modems that were not selected as temporary master during loop initialization, but also for resynchronizing when a single modem fell out of sync while the other modems still operate normally as well as for a current flywheel sync checking mechanism. A flow diagram of this procedure is shown as FIG. 12.

When this mode is entered, a time-out is started in the modem so that complete loop initialization can be started if no sync can be achieved within a given time period.

The modem continues to pass on received data at the receive rate to the next station on the link, and the modulo 4 counter is reset to zero. After receipt of any sync character, a check is made whether it arrived modulo 21 and whether the received CRC character in the respective frame fits to the received data (CRC check only for unavailable frames). If the sync character did not arrive modulo 21 and the modem was not yet in sync, the Local Byte Count (modulo 21 count) is reset, and the time-out is restarted again.

If either arrival time was not modulo 21, or CRC check was negative, a check is made whether the mod. 4 count is already 0. If not yet, the flywheel count is decreased by one unit. If the count is already zero, the modem is set into out-of-sync status (the fact is indicated to the Link Manager for temporarily holding operations).

If mod. 21 arrival check and CRC check were positive, a check is made whether the modulo 4 count is already 3. If not yet, the flywheel count is increased by one unit. If it is already three, the modem is set into sync status (causing notification to Link Manager so that operation can be resumed).

In case a time-out signal is received from the time-out unit during this procedure, a complete loop initialization (procedure 1) will be started assuming that not only the respective modem but the whole loop system is out-of-sync.

6.2 Operation of Modem Functional Units during Initialization and Synchronization In this section, operation of functional units and elements presented above will briefly be explained in connection with initialization and synchronization procedures.

Initialization

When a station or the whole system is switched on, a START signal resets Local Byte Timing Unit 251 (FIG. 8A) which then begins operating modulo 21, controlled by the Local Bit Clock which is initially running independently of a Receive Clock. Also, Initialization Latch 271 INIT is set (MASTER, SLAVE, and SYNC latches 272, 273 and 274 are reset).

In this state, the station transmits sync characters modulo 21 from TED 56 (FIG. 8C) to link 1, with an "unavailable" indication as determined by sync byte register 363 (FIG. 8C). The 19 bytes following each sync character are the station's local address, furnished by local address selector 57 (FIG. 8B) via multiplexers 324 and 351. The twentieth byte in each group, i.e. the one ahead of the next sync character, is a CRC byte from CRC accumulator 355.

While thus transmitting unavailable sync characters and its own address repetitively, the modem watches incoming signals, and first recognizes a clock rate by unit 101 (FIG. 6A). When it later recognizes a sync character (code violations), it resets Received Byte Timing Unit 110 which is then kept running by the Received Bit Clock. This timing unit then also furnishes a Received Bit Count, Received Byte Clock, and Received Byte Count. The Received Byte Timing unit is restarted by each received sync character as long as the station is out of sync.

Once a Received Clock is recognized, the Local Clock rate is adapted to it by clock monitor 153 (FIG. 6B) which issues pulse skip control signals to adapt the average local pulse rate to the always lower received pulse rate.

Under control of the Received Byte Timing unit, the sequence of recognized bits can now be assembled into bytes and shifted through Hold Registers HR0 and HR1 into Variable Length Delay Store 53 VLD. The storage positions are sequentially and cyclically addressed under control of the Local Byte Clock, with an initial shift (offset) of one byte period between writing and reading each byte (contents of delay pointer register 167 being one). The bytes stored in VLD are, however, not used during INIT state.

Received bytes 1 ... 19 after each incoming sync byte are compared to the station's local address in comparator 195 (FIG. 7B). As long as received bytes are greater than the local address, nothing changes. Comparing received bytes to local address continues, and transmission of unavailable sync characters followed by local address bytes is also continued. If, however, a received byte is less than or equal to the local address, a signal pulse on either line 196 or line 197 will cause a change.

Temporary Slave mode

If R<L (received byte less than local address), SLAVE latch 273 (FIG. 8A) is set and INIT latch 271 is reset in the respective modem. This results in the following:

No more sync characters are locally generated and no more local addresses transmitted.

Data out gate 321 (FIG. 8B) is opened so that received data from VLD including sync bytes are forwarded by the modem to the link.

Modulo 4 counter 371 (FIG. 8D) is reset to start synchronizing procedure.

The SET SLAVE pulse will set latch 255 which will cause the next sync byte that is leaving VLD to reset the Local Byte Timing unit.

Each sync character received in wrong timing (not modulo 21) will, as long as the modem has flywheel count of zero (counter 371, FIG. 8D) restart the Local Byte Timing (251, FIG. 8A), and will restart the Received Byte Timing unit as long as the modem is out of sync. Thus, a modem in SLAVE mode repeats received data and resynchronizes to incoming sync characters.

Temporary master mode

The modem having the lowest address will finally receive its own address, causing a pulse on line 197 (FIG. 7B). This will cause setting of MASTER latch 272 (FIG. 8A) but will leave INIT latch 271 set. This results in the following:

The modem continues to send unavailable sync characters followed by its own address (as long as it is not in SYNC state, but still in INIT state).

Modulo 4 counter 371 (FIG. 8D) is reset to start synchronizing procedure.

Each received sync character will reset Received Byte Timing Unit 110 (FIG. 6A) as long as the modem is not in SYNC state.

The SET MASTER pulse will initiate delay pointer circuitry 168...171 (FIG. 7A) so that delay pointer unit 167 will receive advancing pulses between writing of the next received sync byte into VLD 53 (S bit one line 130) and sending of the next locally generated sync byte to the link (timing signal LBT 0/21). Thus the delay is determined as the number of byte periods between the time a sync byte is written into VLD 53 and the time it should be read out of VLD 53 in order to exactly match the still locally generated sync byte in the transmission circuitry. Once the necessary delay is determined it is kept in the delay pointer unit 167 of the temporary master modem until the next initialization procedure, and causes via the addressing circuitry in AFD 54 the necessary delay in VLD 53 to achieve a total loop delay that is an integral number of frame intervals.

Thus, the temporary master while still transmitting locally generated sync characters and local addresses, receives its own data stream back, and this data stream will leave VLD 54 in exact frame synchronism with the generated data stream. When the temporary master modem later switches to SYNC state (explained in next paragraph), it will stop generating unavailable data frames but will repeat its own back-received frames. The frames will then be made available, however, because GATE THROUGH latch 231 (FIG. 7C) will be set when the station receives its own address and the INIT state is finished.

Synchronization/Resynchronization

The same procedure and circuitry is used for initial frame synchronization and resynchronization. When it is out of sync, it needs three correct receipts of a frame before the station is declared to be synchronized, and thereafter it needs three faulty frame receipts before the station is declared to be out of sync.

Modulo 4 counter 371 (FIG. 8D) is the flywheel counter, and is reset by the SET SLAVE and SET MASTER pulses. Each time a sync character is received at the right time (SYNC TIME OK) and no CRC Error is detected if the frame was unavailable, an increasing pulse is sent on line 374 to flywheel counter 371. After this happened three times (counter contents=3), a SET SYNC pulse is issued on line 301 to cause setting of SYNC latch 274. This will also finish the temporary master or temporary slave state by resetting the respective latch (FIG. 8A).

The modem also furnishes the IN-SYNC signal on line 296 to the Link Manager of the station which then can start communication operations. Both byte counters will be kept running modulo 21 without change.

If then a sync character arrives at wrong timing (SYNC TIME ERROR), or an unavailable frame is received with a CRC error, a decrease pulse is issued on line 375 to flywheel counter 371. But a single such error (or even two such errors) will be tolerated and will not yet cause a change in operation. If, however, three consecutive sync time or CRC errors were detected, flywheel counter 371 will contain a zero and cause issuance of a RESET SYNC pulse on line 303 for resetting SYNC latch 274 (FIG. 8A). As a consequence, SLAVE latch 273 will be set again and the procedure described above will begin again. The OUT-SYNC status signal is also transferred on line 278 from the modem to the Link Manager so that the latter can stop communication operations to avoid loss of data.

7. AUTOMATIC DETERMINATION OF FAULT LOCATION

7.1 Principle and Loop Conditions

The procedure and means used for determination of the temporary master during initialization can also be used—with some adaptations—for automatic determination of a fault, e.g. a rupture—on the loop. This may be necessary when an attempt for loop initialization has no success.

The principle is as follows: Stations on the loop are given addresses in ascending order—not necessarily consecutively—as shown in FIG. 13. If then, due to a loop rupture e.g. between stations 6 and 9, modems get out of sync and start the initialization procedure as described in section 6, stations 11, 12, and 2 will receive the address of station 9, and stations 3 and 6 will receive the address of station 2. After a time-out (i.e. unsuccessful initialization procedure), the received address can be gated in the modem not receiving its own or a lower address to a special register for display or interrogation. This station will be the lowest-address station, i.e. station 2, and the received address which is stored or displayed will indicate the station which is next after the fault location on the loop.

Using ascending address sequence on the loop, and using the address comparison and exchange principle of the present invention, there are of course other possibilities besides the one described above for determining the address received by the lowest-address station, and thus determining the location of fault.

7.2 Additional Modem Functions

Figure 14:
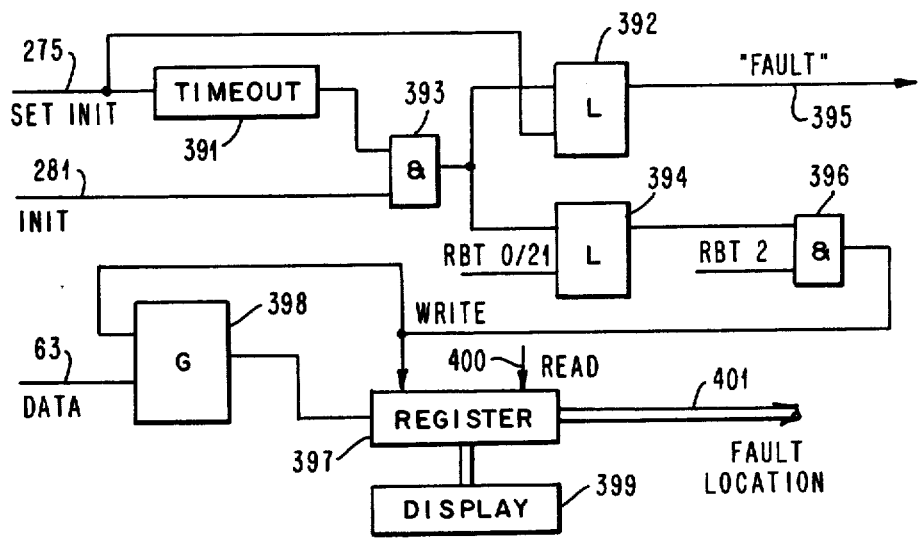
FIG. 14 Modem extensions for automatic fault localization.

A few additional functions such as those shown in FIG. 14 may be incorporated into each modem for handling the fault locating operations.

A time-out unit 391 is started whenever a SET INIT pulse appears on line 275. This pulse also resets latch 392. If the initialization status INIT is still indicated on line 281 when the time signal appears on the output of time-out unit 391, AND gate 393 will furnish a pulse for setting latches 392 and 394. Output line 395 of latch 392 will indicate the fault condition of the system, and could start an alarm signal.

The active output signal of latch 394 will be forwarded by AND gate 396 at RBT 2 (Origin Address byte time) as a write signal to special register 397 and as a control signal to gate 398. This gate will then forward the received address available on input lines 63 of hold register array 52 to special register 397. This address can be displayed in a display unit 399 or be forwarded by a read signal on a control line 400 to output lines 401.

We claim:

1. In a serial loop data communication system including a plurality of stations serially interconnected by way of a communications link, said stations being further characterized with respect to any selected station as preceding stations that are upstream on said link from said selected station or succeeding stations that are downstream from said selected station, said stations operating on a peer-to-peer basis, and each of said stations being designated by a uniquely identifiable address code, said stations transmitting and receiving message frames including synchronization characters for transfer of information in the form of messages from one station to another, said frames being categorized as available or unavailable, each station transmitting only on frames that are marked as available or that have an address code equal to the station address code and each station marking frames transmitted by it as unavailable if the station has inserted information in said frames and each station further marking frames transmitted by it as available if the station has no information to transfer, and each of said stations incorporating a modem for handling link related functions, such as information coding, and modulation, and the like, a loop initialization system for achieving synchronized frame transmission around the loop for all stations upon system start or after loss of frame synchronization on the loop by defining one of said stations as a temporary master station to create available message frames for use in establishing synchronized operation of said system and comprising at each station:

synchronization means including synchronization circuitry at each modem responsive to synchronization characters transmitted on said communications link for establishing synchronization of said station with other stations in said system and for detecting an out of sync condition such as upon start up of said system or upon unsuccessful modem synchronization efforts exceeding a given time period, said synchronization means being operable to reset the related modem synchronization circuitry and to transmit unavailable frames including a sync character and a code violation character followed by the address of its related station and all byte fields of consecutive frames at a local modem clock rate;

means for locally receiving at any station an address code transmitted from the preceding station in said loop;

means for comparing the received address code with the address code of the related receiving station;

means for transmitting the address code received from the preceding station to the next succeeding station in said loop if the value of the received address code is less than that of the receiving station;

means for transmitting the local address code of the receiving station to the next succeeding station in said loop if the value of the received address code is greater than that of the receiving station; and mode means operable upon the related modem receiving from the preceding station an address code corresponding to the address code of the receiving station for a predetermined minimum number of times to set the respective modem to a temporary master state with respect to all other modems in said system, all other modems thereby being conditioned to a slave state and to continue generation by said temporary master modem of unavailable message frames including synchronization characters over said communications link for use by all other modems in a slave state to achieve synchronization.

2. The system according to claim 1 additionally comprising at each station:

a variable delay storage unit; and loop delay adjust means at each station operable when said station has been activated as a temporary master to initiate a loop delay adjust procedure utilizing said variable delay storage unit to increase storage duration at said station activated as a temporary master by inserting in the transmission loop an additional local delay so that total loop propagation time is an integer multiple of the frame duration, i.e. a sync character is received in accordance with a predetermined frequency whereby coincidence is obtained between the first character of locally generated message frames and the first character of message frames received from the preceding station and passed through the receiving station for retransmission on the loop.

3. The system according to claim 1 in which each frame comprises a plurality of characters and further comprising at each station:

local clock means including an oscillator for generating clock pulses at a predetermined frequency;

means for transmitting locally generated characters or characters received from the preceding station at a local clock frequency; and clock control circuitry for generating received clock pulses from characters received from the preceding station, and for adjusting the local clock frequency to the received clock pulse frequency.

4. The system according to claim 3 comprising at each station:

clock monitoring means responsive to said local clock pulses and said received clock pulses for generating a skip request signal when the difference between the count of local clock pulses and the count of received clock pulses exceeds a preselected number; and means in said local clock means responsive to said skip request signal for skipping a single clock pulse.

5. The system according to claim 3 wherein said synchronization means at each station further comprises:
   means for accumulating a character count value of received characters based on a count modulo of a predetermined number of characters per frame;
   means for detecting synchronization characters in received frames;
   synchronization count means for maintaining a synchronization count between a minimum and a maximum setting;
   coincidence detection means generating a first control signal when a synchronization character is detected in coincidence with a character count value corresponding to said count modulo and generating a second control signal when a synchronization character is detected and said character count is not at said count modulo; and
   count control means in said synchronization count means responsive to each first control signal for increasing the count of said synchronization count means, and responsive to each second control signal for decreasing the count of said synchronization count means.

6. The system according to claim 5 further comprising at each station:
   means for error checking the contents of each received frame and generating a third control signal when an error is detected; and
   wherein said synchronization count means is responsive to each third control signal for decreasing the count of said synchronization count means.

7. The system according to claim 5 comprising at each station:
   means in said synchronization count means for generating a maximum count signal indicative of said count reaching a maximum value and a minimum count signal indicative of said count reaching a minimum value;
   status means in said synchronization means settable to a state for indicating a synchronized condition of the related station and resettable to a state for indicating an out of synchronization state of the related station; and
   means in said synchronization means responsive to a maximum count signal from said synchronization count means for setting said status means and further responsive to a minimum count signal from said synchronization count means for resetting said status means.

8. The system according to claim 7 comprising at each station:
   means connected to said status means for providing a signal to indicate when said status means is in a reset state;
   time-out means responsive to said reset indicating signal to issue a time-out control signal upon expiration of a predetermined period of time; and wherein
   said synchronization means is responsive to said time-out control signal to initiate synchronization of said loop.

9. The system according to claim 1 wherein:
   the addresses of the stations around the loop are assigned in an ascending numerical order from a particular station location; and wherein
   at least one station comprises fault indicating means operable to generate a fault indicating indicating signal upon not receiving from the preceding station within a predetermined time period after start of any loop initialization procedure an address that is either less than or equal to the address of the respective station.

10. The system according to claim 9 wherein an address received at any local station from the preceding station serves as a fault location address designating the next station situated after a loop fault location and in which each station comprising said fault indicating signal generation means additionally includes:
    means responsive to said fault indicating signal for storing and/or displaying said fault location address.

11. In a serial loop data communication system including a plurality of stations serially interconnected by way of a communications link, said stations transmitting and receiving message frames including synchronization characters for transfer of information in the form of messages from one station to another each frame comprising a plurality of characters and each of said stations incorporating a modem for handling link related functions, such as information coding and modulation and the like, a system for achieving synchronized operation of a station after loss of frame synchronization comprising at each station:
    synchronization means including synchronization circuitry at each modem responsive to synchronization characters transmitted on said communications link for establishing synchronization of said station with other stations in said system and for detecting an out of sync condition upon start up of said system or unsuccessful modem synchronization efforts, said synchronization means being operable to reset the related modem synchronization circuitry;
    local clock means including an oscillator for generating clock pulses at a predetermined frequency;
    means for transmitting locally generated characters or characters received from another station in said link at a local clock frequency;
    clock control circuitry for generating received clock pulses from characters received from another station, based on a count modulo of a predetermined number of characters per frame, and for adjusting the local clock frequency to the received clock pulse frequency.

12. The system according to claim 11 further comprising:
    clock monitoring means responsive to said local pulses and said received clock pulses for generating a skip request signal when the difference between the count of local clock pulses and the count of received clock pulses exceed a preselected number; and
    means in said local clock means responsive to said skip request signal for skipping a single clock pulse.

13. The system according to claim 11 wherein said synchronization means at each station further comprises:
    means for accumulating a character count value of received characters based on a count modulo of a predetermined number of characters per frame;
    means for detecting synchronization characters in received frames;

synchronization count means for maintaining a synchronization count between a minimum and a maximum setting;

coincidence detection means generating a first control signal when a synchronization character is detected in coincidence with a character count value corresponding to said count modulo and generating a second control signal when a synchronization character is detected and said character count value is not at said count modulo; and count control means in said synchronization count means responsive to each first control signal for increasing the count of said synchronization count means and responsive to each second control signal for decreasing the count of said synchronization count means.

14. The system according to claim 13 further comprising at each station:

means for error checking the contents of each received frame and generating a third control signal when an error is detected; and wherein said synchronization count means is responsive to each third control signal for decreasing the count of said synchronization count means.

15. The system according to claim 13 comprising at each station:

means in said synchronization count means for generating a maximum count signal indicative of said count reaching a maximum value and a minimum count signal indicative of said count reaching a minimum value;

status means in said synchronization means settable to a state for indicating a synchronized condition of the related station and resettable to a state for indicating an out of synchronization state of the related station; and means in said synchronization means responsive to a maximum count signal from said synchronization count means for setting said status means and further responsive to a minimum count signal from said synchronization count means for resetting said status means.

* * * * *